US008718401B2

(12) United States Patent
Tokunaga et al.

(10) Patent No.: US 8,718,401 B2
(45) Date of Patent: May 6, 2014

(54) IMAGE PROCESSING DEVICE, METHOD AND PROGRAM

(75) Inventors: Nodoka Tokunaga, Tokyo (JP); Jun Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 12/871,449

(22) Filed: Aug. 30, 2010

(65) Prior Publication Data

US 2011/0103683 A1 May 5, 2011

(30) Foreign Application Priority Data

Sep. 4, 2009 (JP) ................................ P2009-204425

(51) Int. Cl.
G06K 9/00 (2006.01)
G06K 9/46 (2006.01)
G06K 9/54 (2006.01)
G06K 9/60 (2006.01)
G06K 9/66 (2006.01)
H04N 9/74 (2006.01)
G09G 5/00 (2006.01)

(52) U.S. Cl.
USPC ........... 382/284; 382/165; 382/195; 382/305; 348/588; 345/625; 345/634

(58) Field of Classification Search
USPC ......... 382/100, 103, 162, 165, 173, 181, 190, 382/195, 203, 209, 224, 254–255, 260–264, 382/266, 274–276, 282, 284, 293–300, 382/305; 348/222.1, 578–580; 345/419–427; 707/821–831
See application file for complete search history.

(56) References Cited

U.S. PATENT DOCUMENTS

| | | | | |
|---|---|---|---|---|
| 6,137,498 A | * | 10/2000 | Silvers | 345/629 |
| 6,556,210 B1 | * | 4/2003 | Yamamoto et al. | 345/582 |
| 2002/0126911 A1 | * | 9/2002 | Gindele et al. | 382/254 |
| 2005/0135667 A1 | * | 6/2005 | Saarela et al. | 382/141 |
| 2005/0147322 A1 | * | 7/2005 | Saed | 382/284 |
| 2007/0296824 A1 | * | 12/2007 | Paine et al. | 348/222.1 |
| 2008/0095466 A1 | * | 4/2008 | Kinrot et al. | 382/284 |
| 2008/0260202 A1 | * | 10/2008 | Roth | 382/100 |
| 2009/0263010 A1 | * | 10/2009 | Zhang et al. | 382/159 |
| 2011/0050723 A1 | * | 3/2011 | Tokunaga et al. | 345/627 |
| 2011/0058057 A1 | * | 3/2011 | Tokunaga et al. | 348/222.1 |

FOREIGN PATENT DOCUMENTS

| | | |
|---|---|---|
| JP | 11-341266 | 12/1999 |
| JP | 11-345311 | 12/1999 |
| JP | 2000-298722 | 10/2000 |
| JP | 2005-100120 | 4/2005 |

OTHER PUBLICATIONS

Arimura et al (PCT JP/2009/050063 also referred to as WO/2009/090901), Jul. 23, 2009, published by WIPO in Japanese.*

* cited by examiner

*Primary Examiner* — Randolph I Chu
*Assistant Examiner* — Nathan Bloom
(74) *Attorney, Agent, or Firm* — Sony Corporation

(57) ABSTRACT

An image processing device includes a subject detecting unit detecting a subject on a material image, a working unit performing a working process on the material image such that a region of the subject puts in the block, an image generating unit clipping a subject-including region of the material image so as to have the same form and size as the block and generating a subject-including clipped image and a replacing unit setting one clipped image which is the most similar to the block in terms of color-related characteristics as the replacement image for each block of the production target image and replacing the block by the replacement image to generate a photo-mosaic image.

10 Claims, 13 Drawing Sheets

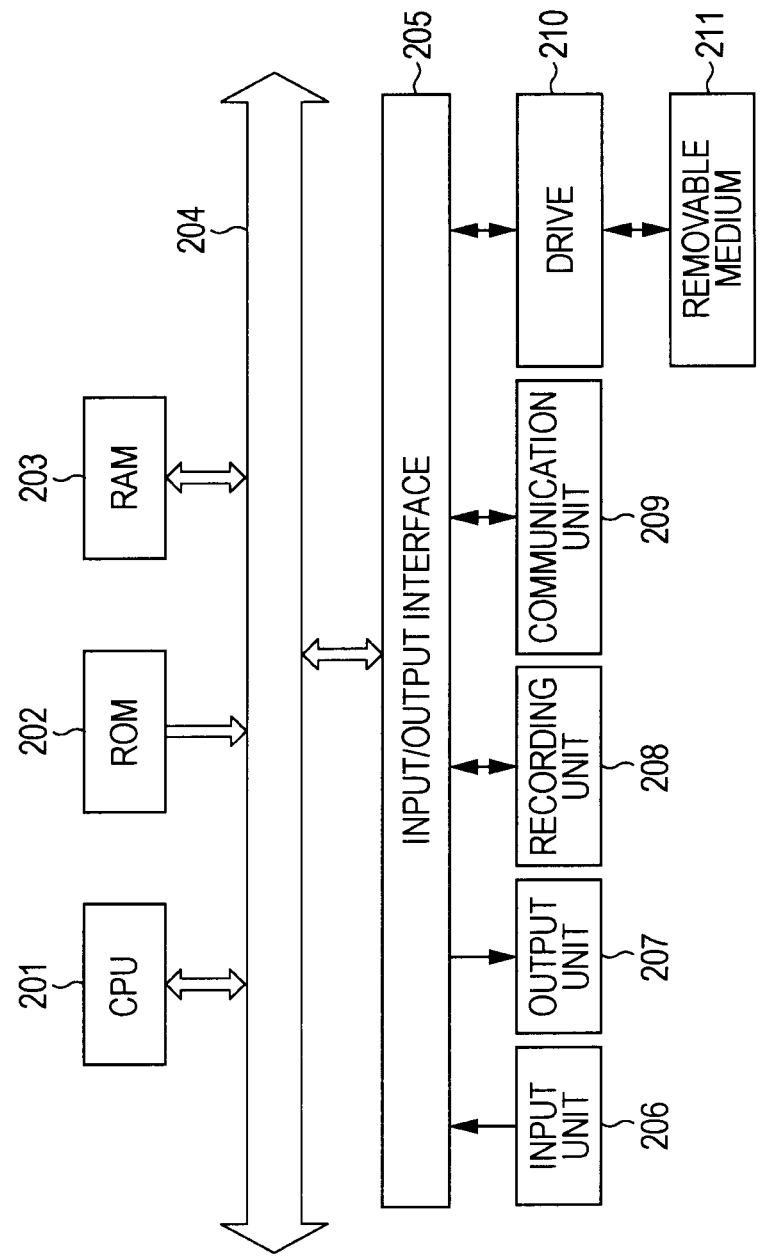

IMAGE PROCESSING DEVICE, METHOD AND PROGRAM

BACKGROUND OF THE INVENTION

1. Field of the Invention

The present invention relates to image processing device, method and program and, more particularly, relates to image processing device, method and program allowing to obtain a photo-mosaic image of higher quality.

2. Description of the Related Art

Nowadays, the number of users who take many photographs is being more and more increased owing to spreading use of digital still cameras. In addition, a method of effectively exhibiting a large number of photographs taken is now being sought for.

As a method of effectively exhibiting a photograph taken, a method of exhibiting a photograph in the form of a photo-mosaic image is proposed. The photo-mosaic image is an image which is obtained by dividing one target image (hereinafter referred to as one production target image (one target image to be produced)) into a plurality of rectangular blocks and replacing the respective blocks by other different images (hereinafter, referred to as replacement images) whose colors are similar to those of the blocks.

Thus, if the photo-mosaic image is observed at a distance, a subject (a photographic subject) which is the same as that on the production target image will be observed with the eyes of an observer. However, if the photo-mosaic image is observed close at hand, the subject will be observed in the form of a plurality of different replacement images which are arrayed.

As a technique for generating a photo-mosaic image as described above, a technique for selecting each image to be arranged in each block by obtaining a distance between a representative value of a color of each block of a production target image and a representative value of a color of each image as a candidate for a replacement image by a calculation with weighting is proposed (see, for example, Japanese Unexamined Patent Application Publication No. 2000-298722). In addition, a technique for partitioning a production target image into partition regions constituted of a plurality of blocks in accordance with color approximation and classifying candidates for a replacement images so as to belong to respective classes corresponding to the partition regions, thereby generating a photo-mosaic image using the candidate which belongs to the corresponding class per partition region is proposed (see, for example, Japanese Unexamined Patent Application Publication No. 2005-100120).

Further, a method of more finely dividing blocks of a production target image into pieces and collating the more finely divided piece with an image to be used as a candidate for a replacement image, thereby generating a photo-mosaic image while maintaining the color distribution of the original production target image is proposed (see, for example, Japanese Unexamined Patent Application Publication No. 11-341266).

Still further, a method of clipping a previously determined region of an image after a template which is prepared in advance and using a clipped image obtained by clipping the region as a candidate for a replacement image to be allocated to each block, thereby generating a photo-mosaic image is proposed (see, for example, Japanese Unexamined Patent Application Publication No. 11-345311). In the above mentioned method, in the case that an image which has been so inappropriately clipped as to degrade the quality of the photo-mosaic image, that is, the appearance of the photo-mosaic image, for example, in the case that only a half of the region of the face of a person on an image has been clipped, the inappropriately clipped image is manually or automatically excluded from the candidates for the replacement image.

SUMMARY OF THE INVENTION

Incidentally, many images and know-how used for preparation of the images may be necessary for generation of a photo-mosaic image. Therefore, although the photo-mosaic image is commercially utilized in a poster to be put up to advertise a movie or in a logotype of an enterprise, it may not be so easy for an average user to generate a photo-mosaic image of high quality by utilizing his/her personal computer or the like.

For example, in the case that a production target image is divided into blocks of forms other than the rectangular form so as to intend to express some message using the form of each block and to generate a more artistic photo-mosaic image, it may be difficult to obtain the photo-mosaic image of high quality.

That is, in the techniques described in Japanese Unexamined Patent Application Publication Nos. 2000-298722, 2005-100120 and 11-341266, it is preconditioned to divide the image into rectangular blocks and hence it may be difficult to generate the photo-mosaic image by dividing the production target image into blocks of forms other than the rectangle.

In the technique described in Japanese Unexamined Patent Application Publication No. 11-345311, the previously determined region on the image is clipped after the template to obtain the clipped image and hence it may be allowed to make each block have an arbitrary form by clipping the region so as to have a form other than the rectangle.

However, the previously determined region on the image is clipped as the clipped image, so that many clipped images obtained may be inappropriate to be used as the replacement images. Thus, the sufficient number of clipped images to be used as the candidates for the replacement image may not be obtained and hence the quality of the photo-mosaic image may be degraded.

Specifically, in order to obtain a photo-mosaic image of high quality, that is, an attractive photo-mosaic image, it may be necessary to select the replacement images to be allocated to the respective blocks of the production target image so as to avoid reuse of one replacement image as much as possible. The reason for the above lies in the fact that in the case that a certain number of images which are the same as the replacement image which has been determined for one block of the production target image are arranged in the vicinity of the block, the photo-mosaic image which is not attractive both when observed at a distance and when observed close at hand may be obtained. In addition, in order to obtain a photo-mosaic image of higher quality, it may become necessary to select each replacement image which is similar to each corresponding block of the production target image in terms of color distribution so as to be used for each corresponding block.

However, in the case that many clipped images obtained by clipping parts of the image are inappropriate to be used as the replacement images, the sufficient number of clipped images which will be used as the candidates for the replacement image may not be obtained. In the above mentioned situation, one clipped image may be used over and over again as the replacement image, a clipped image which is similar to the corresponding block in terms of color-related characteristics may not be obtained and hence it may become difficult to obtain a photo-mosaic image of high quality.

The present invention has been made in view of the above mentioned circumstances. Therefore, it is desirable to obtain a photo-mosaic image of high quality even in the case that the photo-mosaic image is generated by dividing a production target image into blocks of arbitrary forms.

An image processing device according to an embodiment of the present invention is configured to generate a photo-mosaic image by dividing a production target image into a plurality of blocks of arbitrary forms and replacing the blocks by replacement images and includes a subject detecting unit configured to detect a subject on a material image on the basis of the material image used to generate the replacement images, a working unit configured to perform a working process on the material image conforming to the form and size of the block concerned such that a region of the subject on the material image puts in the block, an image generating unit configured to clip a subject-including region of the material image which has been subjected to the working process so as to have the same form and size as the block and to generate a clipped image in which the subject is included, and a replacing unit configured to set one of a plurality of clipped images which is the most similar to the block in terms of color-related characteristics as the replacement image for each block of the production target image and replace the block by the replacement image to generate the photo-mosaic image.

The working unit may be configured to perform at least one of a material image magnifying process, a material image minifying process, a material image deforming process and a material image rotating process on the material image as the working process.

The image processing device may also include a fuzz detecting unit configured to detect fuzz generated on the material image and a fuzz removing unit configured to perform a filtering process to remove the fuzz on the material image.

The image processing device may further include a noise detecting unit configured to detect noise on the material image and a noise removing unit configured to perform a filtering process to remove the noise on the material image.

Tag information about the subject on the material image may be added in advance to the material image, the image generating unit may be configured to generate the clipped image to which the tag information is added, the device may further include a selecting unit configured to select clipped images, each including the subject which is related to the form of the block, as candidates for the replacement image from among the plurality of clipped images on the basis of the tag information added to the clipped image and the replacing unit may be configured to select one clipped image to be used as the replacement image from the candidates for the replacement image which are selected using the selecting unit to generate the photo-mosaic image.

Tag information about the subject on the material image may be added in advance to the material image, the device further include a selecting unit configured to select the material image which includes the subject which is related to the form of the block as an object to be used to generate the clipped image on the basis of the tag information, and the working unit may be configured to perform the working process on the material image which is selected using the selecting unit.

The image processing device may further include a selecting unit configured to identify the subject on the clipped image by object recognition on the basis of the clipped image and to select the clipped images, each including the subject which is related to the form of the block, from among the plurality of clipped images as candidates for the replacement image on the basis of a result of identification executed, the replacing unit may be configured to select one clipped image to be used as the replacement image from the candidates for the replacement image which is selected using the selecting unit to generate the photo-mosaic image.

The image processing device may further include a selecting unit configured to identify the subject on the material image by object recognition on the basis of the material image and to select the material image which includes the subject which is related to the form of the block as an object to be used to generate the clipped image on the basis of a result of identification executed, the working unit may be configured to perform the working process on the material image which is selected using the selecting unit.

An image processing method or program according to an embodiment of the present invention is an image processing method or program of generating a photo-mosaic image by dividing a production target image into a plurality of blocks of arbitrary forms and replacing the blocks by replacement images, and includes the steps of detecting a subject on a material image on the basis of the material image used to generate the replacement images, performing a working process on the material image conforming to the form and size of the block concerned such that a region of the subject on the material image puts in the block, generating a clipped image including the subject by clipping the subject-including region of the material image which has been subjected to the working process so as to have the same form and size as the block and generating a clipped image in which the subject is included, and setting one of a plurality of clipped images which is the most similar to the block in terms of color-related characteristics as the replacement image for each block on the production target image and replacing the block by the replacement image to generate the photo-mosaic image.

According to an embodiment of the present invention, in image processing of generating a photo-mosaic image by dividing a production target image into a plurality of blocks of arbitrary forms and replacing the blocks by replacement images, a subject on a material image is detected on the basis of the material image used to generate the replacement images, a working process is performed on the material image conforming to the form and size of the block concerned such that a region of the subject on the material image puts in the block, the subject-including region on the material image which has been subjected to the working process is clipped so as to have the same form and size as the block and a clipped image in which the subject is included is generated, and one of a plurality of clipped images which is the most similar to the block in terms of color-related characteristics is set as the replacement image for each block of the production target image and the block is replaced by the replacement image to generate the photo-mosaic image.

According to an embodiment of the present invention, even in the case that a photo-mosaic image is generated by dividing a production target image into blocks of arbitrary forms, the photo-mosaic image of higher quality may be obtained.

BRIEF DESCRIPTION OF THE DRAWINGS

FIG. 14 is a diagram illustrating an example of a configuration of a computer.

DESCRIPTION OF THE PREFERRED EMBODIMENTS

Next, embodiments to which the present invention may be applied will be described with reference to the accompanying drawings.

First Embodiment

Configuration of Image Processing Device

Figure 1:
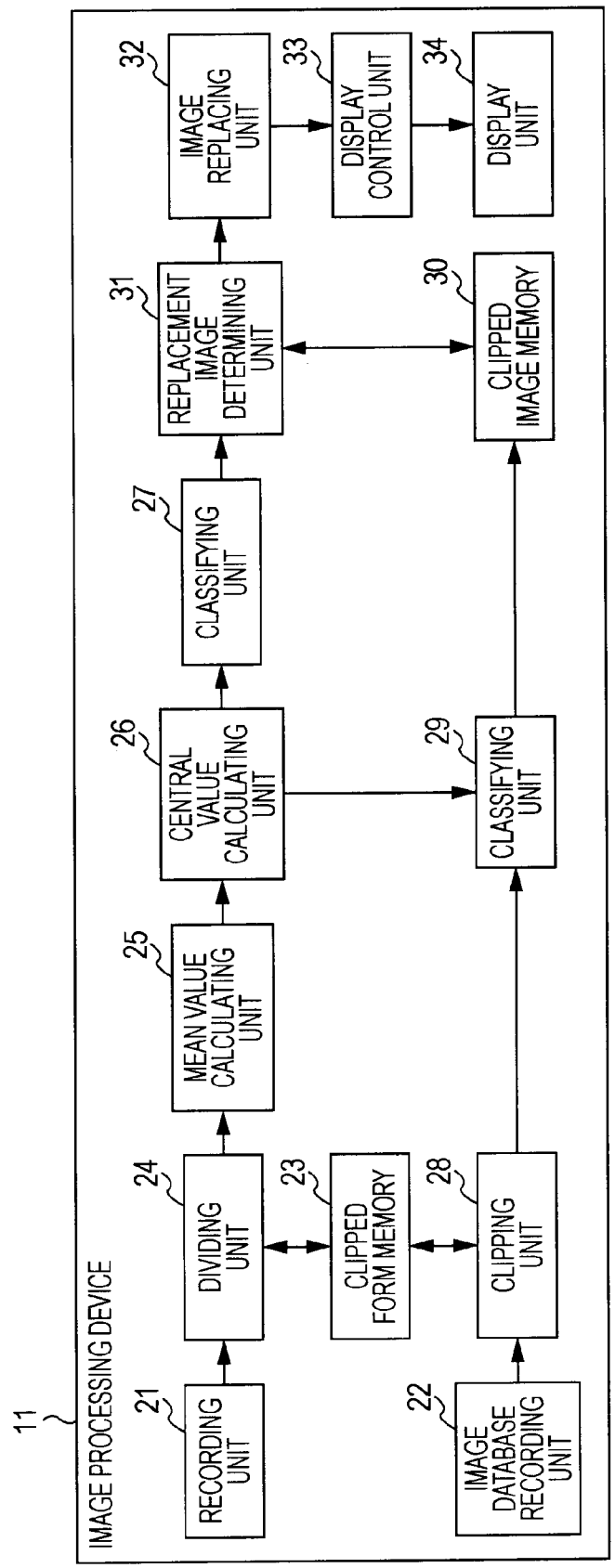
FIG. 1 is a diagram illustrating an example of a configuration of an image processing device to which the present invention may be applied.

FIG. 1 is a diagram illustrating an example of a configuration of an image processing device to which the present invention may be applied.

An image processing device 11 is configured to generate one photo-mosaic image by dividing one production target image into a plurality of blocks of arbitrary forms and replacing the respective blocks by other different images.

The image processing device 11 includes a recording unit 21, an image database recording unit 22, a clipped form memory 23, a dividing unit 24, a mean value calculating unit 25, a central value calculating unit 26, a classifying unit 27, a clipping unit 28, a classifying unit 29, a clipped image memory 30, a replacement image determining unit 31, an image replacing unit 32, a display control unit and a display unit 34.

The recording unit 21 records therein a plurality of production target images which have been prepared in advance and supplies each production target image to the dividing unit 24. The image database recording unit 22 records an image database which includes a plurality of material images which have been prepared in advance and supplies each material image to the clipping unit 28. The material image is an image which will be used as the material of a replacement image to be arranged in each block of a production target image.

The clipped form memory 23 holds in advance block form information indicative of forms and sizes of respective blocks into which a production target image is to be divided and positions of these blocks on the production target image and supplies the block form information to the dividing unit 24 or the clipping unit 28.

In the example illustrated in FIG. 1, the block may have either a rectangular form or another arbitrary form and the respective blocks on the production target image may have sizes and forms which are different from one another. However, the forms and sizes of the respective blocks are determined in advance such that in dividing a production target image, a close-laying condition may be satisfied, that is, the production target image may be divided into a plurality of blocks compactly. In other words, the respective blocks are arranged on the production target image with no space between the adjacent blocks.

As an example of dividing a production target image so as to satisfy the close-laying condition, for example, an example of dividing the production target image into a plurality of congruent polygons which are coupled to one another so as to satisfy a regular-dividing condition may be given. An image division pattern which may satisfy the regular-dividing condition may be obtained, for example, by arranging patterns which may constitute blocks on a production target image and moving the patterns by geometric movement so as to fill the production target image with the plurality of blocks, defining the positions of the patterns obtained after movement as new positions of the blocks.

In the explanation of the first the embodiment, the geometric movement of the patterns includes translation to move respective patterns in parallel with one another vertically and horizontally, mirroring to fold each pattern using one side of the pattern as an axis, rotation to rotate each pattern centering on the apex of the pattern, slid mirroring to mirror respective patterns and then to move the patterns in parallel with one another and a combination of the above mentioned moving operations.

The dividing unit 24 divides the production target image supplied from the recording unit 21 into a plurality of blocks with reference to the block form information recorded in the clipped form memory 23 and supplies the blocks to the mean value calculating unit 25. The mean value calculating unit 25 calculates a mean value of pixel values of pixels in each block supplied from the dividing unit 24 as a characteristic amount of a first characteristic which is related to the color of each block and supplies the mean value of the pixel values and each block to the central value calculating unit 26. The average value indicates the average color of the pixels included in each block.

The mean value in each block (the means value of the pixel values of the pixels included in each block) is an example of the characteristic amount of the first characteristic related to the color of the block, that is, the representative value of the block. As other examples of the representative value, a pixel value indicating the position of the central coordinates of each block, a mean value of pixels values of pixels at predetermined coordinate positions in each block and the like may be given.

The central value calculating unit 26 calculates a central value which indicates a characteristic amount of a first characteristic related to the color of each class and which is used to classify blocks so as to belong to respective classes by using the mean value of each block supplied from the mean value calculating unit 25. Incidentally, each class is determined in accordance with the characteristic amount of the first color-related characteristic which is extracted from the production target image and each block is classified so as to belong to the class to which the block is the most similar using the first color-related characteristic as an index.

In addition, the central value used for classification indicates a representative (average) color of the block which belongs to the class concerned. The central value calculating unit 26 supplies the block-divided production target image (the production target image which has been divided into blocks), the central value of each class and the mean value of each block to the classifying unit 27 and supplies the central value of each class to the classifying unit 29.

The classifying unit 27 classifies each block so as to belong to one of classes by using the central value of each class and the mean value of each block supplied from the central value calculating unit 26 and supplies a result of classification performed and the block-divided production target image to the replacement image determining unit 31.

The clipping unit 28 clips some regions of the material image recorded in the image database recording unit 22 with reference to the block form information recorded in the clipped form memory 23 to generate clipped images and supplies the clipped images to the classifying unit 29. Specifically, the material image is appropriately worked such that a subject on the material image may put in a block indicated by the block form information and a subject-including region on the worked material image which is the same as the block in terms of form and size is clipped as a clipped image.

The classifying unit 29 classifies the clipped image supplied from the clipping unit 28 so as to belong to one of classes by using the central value of each class supplied from the central value calculating unit 26 and supplies a result of classification executed and the clipped images obtained to the clipped image memory 30 to be recorded therein.

The replacement image determining unit 31 determines a clipped image to be allocated to each block by using the result of classification of each block and the blocks supplied from the classifying unit 27, the result of classification of respective clipped images recorded in the clipped image memory 30 and the clipped images. Among clipped images which may satisfy a predetermined condition, one clipped image which is the most similar to the block concerned in terms of a second color-related characteristic, for example, the structure (distribution) of the color thereof is allocated to each block.

The replacement image determining unit 31 supplies the block-divided production target image and the clipped images allocated to respective blocks which have been supplied from the classifying unit 27 to the image replacing unit 32. Incidentally, in the following explanation, the clipped image which has been allocated to each block will be also referred to as a replacement image.

The image replacing unit 32 replaces each block of the production target image supplied from the replacement image determining unit 31 by the replacement image allocated to each block to generate a photo-mosaic image and supplies the generated photo-mosaic image to the display control unit 33. The display control unit 33 supplies the photo-mosaic image which has been supplied from the image replacing unit 32 to the display unit 34 to be displayed. The display unit 34 displays various kinds of images under the control of the display control unit 33.

Incidentally, the photo-mosaic image which has been finally obtained may be displayed, printed, recorded into a recording medium as data or transferred to another device connected with the image processing device 11.

Configuration of Clipping Unit

Figure 2:
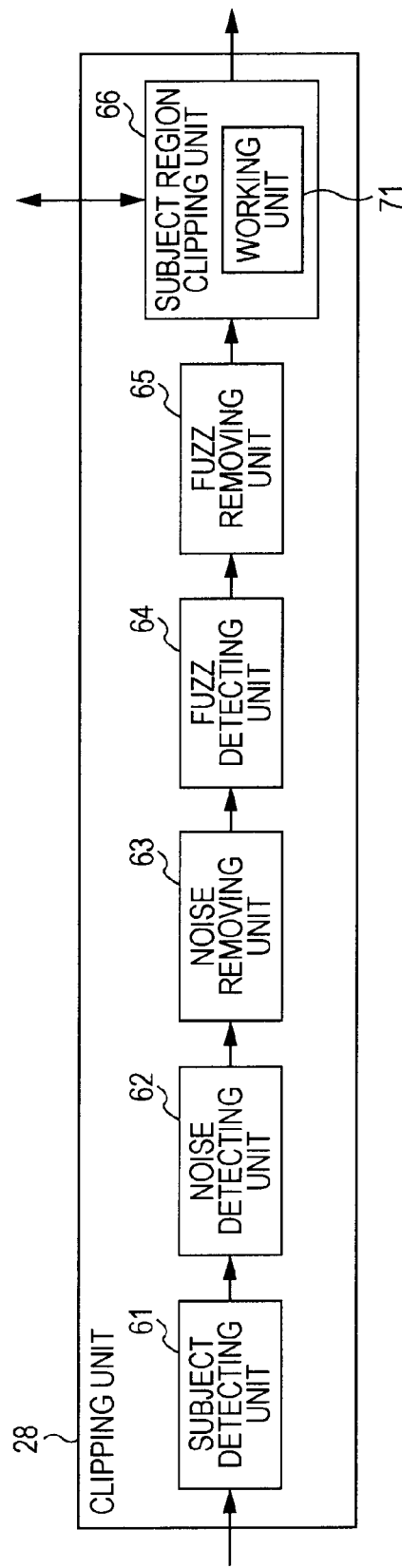
FIG. 2 is a diagram illustrating one example of a configuration of a clipping unit.

The clipping unit 28 illustrated in FIG. 1 is configured in more detail as illustrated in an example in FIG. 2.

That is, the clipping unit 28 includes a subject detecting unit 61, a noise detecting unit 62, a noise removing unit 63, a fuzz detecting unit 64, a fuzz removing unit 65 and a subject region clipping unit 66.

The subject detecting unit 61 detects the region of a subject on the material image on the basis of the material image acquired from the image database recording unit 22 and supplies a result of detection performed and the material image to the noise detecting unit 62. The noise detecting unit 62 detects noise from the material image supplied from the subject detecting unit 61 and supplies a result of detection performed, the material image and the result of detection of the subject to the noise removing unit 63. The noise removing unit 63 removes the noise from the material image on the basis of the result of noise detection supplied from the noise detecting unit 62 and supplies the noise-removed material image (the material image from which the noise has been removed) and the result of subject detection to the fuzz detecting unit 64.

The fuzz detecting unit 64 detects fuzz from the material image sent from the noise detecting unit 63 and supplies a result of detection performed, the material image and the result of detection of the subject to the fuzz removing unit 65. The fuzz removing unit 65 removes the fuzz from the material image on the basis of the result of detection of the fuzz sent from the fuzz detecting unit 64 and supplies the fuzz-removed material image and the result of detection of the subject to the subject region clipping unit 66.

The subject region clipping unit 66 generates a clipped image on the basis of the result of detection of the subject and the material image supplied from the fuzz removing unit 65 and the block form information recorded in the clipped form memory 23 and supplies the generated clipped image to the classifying nit 29.

The subject region clipping unit 66 includes a working unit 71. The working unit 71 appropriately works the material image such that the subject may put in a block concerned when a subject including region on the material image is clipped after the form of the block indicated by the block form information as a clipped image. In the example illustrated in the drawing, the material image is subjected to a working process such as a magnifying process, a minifying process, a deforming process or a rotating process. In the case that working of the material image is thought not to be necessary, any working process may not be executed on the material image.

Incidentally, the clipping unit 28 includes a mechanism configured to detect and remove noise from the material image and a mechanism configured to detect and remove fuzz. As an alternative, the clipping unit 28 may include one of them.

Explanation of Process of Generating Photo-Mosaic Image

Incidentally, in the case that a user operates the image processing device 11 to designate a production target image and to instruct to generate a photo-mosaic image using the production target image, the image processing device 11 performs a process of generating the photo-mosaic image in accordance with the instruction from the user to generate the photo-mosaic image.

Next, a process of generating a photo-mosaic image performed using the image processing device 11 will be described with reference to an example of a flowchart illustrated in FIG. 3.

At step S11, the dividing unit 24 reads the production target image designated by the user out of the recording unit 21. At step S12, the dividing unit 24 divides the read production target image into a plurality of blocks with reference to the block form information recorded in the clipped form memory 23. That is, the production target image is divided into blocks so as to conform to the forms, sizes and arrangement of blocks indicated by the block form information.

Incidentally, in the case that a plurality of pieces of block form information are recorded in the clipped form memory 23, the user may designate as to which block form information is to be used, that is, into which blocks the production target image is to be divided.

Figure 4:
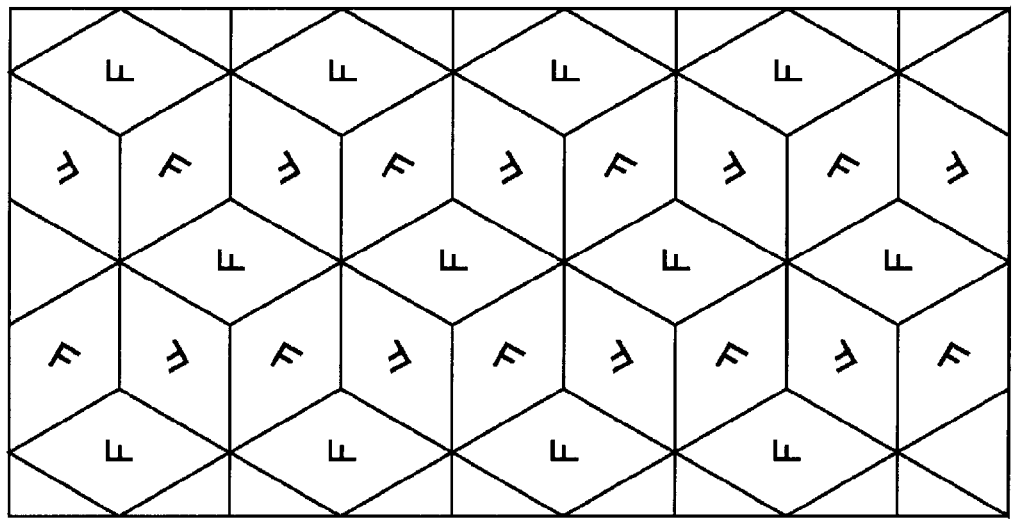
FIG. 4 is a diagram illustrating one example of division of a production target image into blocks.
Figure 5:
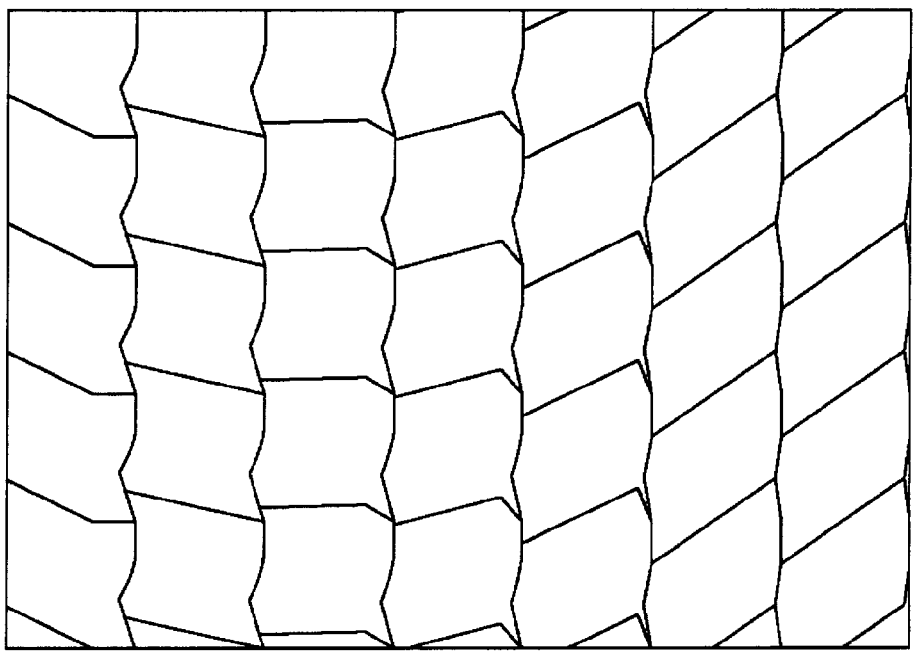
FIG. 5 is a diagram illustrating another example of division of a production target image into blocks.
Figure 6:
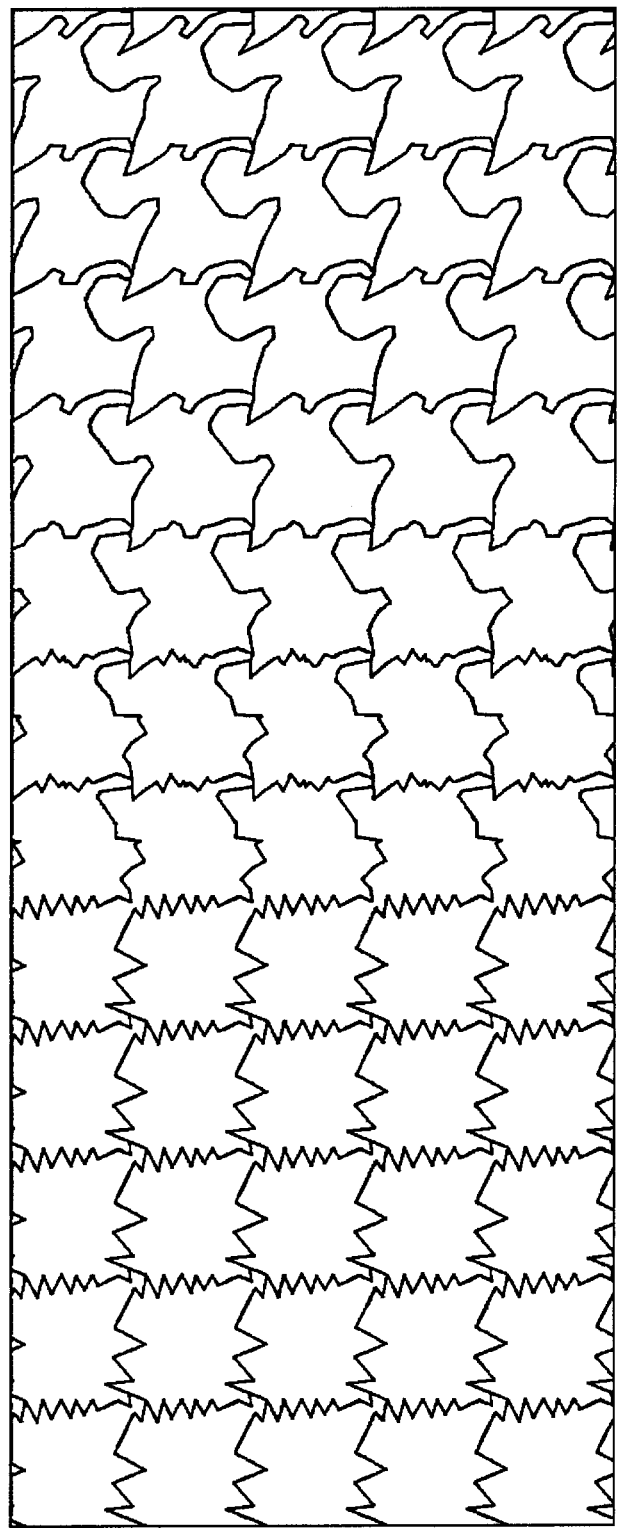
FIG. 6 is a diagram illustrating a further example of division of a production target image into blocks.

In the example illustrated in the drawing, the production target image is divided into a plurality of blocks which would satisfy the close-laying condition, for example, as illustrated in FIGS. 4, 5 and 6.

In the example illustrated in FIG. 4, the production target image is divided into a plurality of blocks which exhibit mutually adjacent parallelograms. In the drawing, one parallelogram indicates one block and the orientation of the letter "F" in each block indicates the orientation of each block. That is, in the example illustrated in FIG. 4, the plurality of blocks of the same form are arranged to orient in different directions.

In the example illustrated in FIG. 5, a production target image is divided into a plurality of blocks of different forms. On the production target image, the forms of the blocks which are horizontally arrayed gradually change in accordance with the positions at which the respective blocks are horizontally disposed. A pattern in which the forms of the blocks which are arrayed in a predetermined direction as described above change in accordance with the positions at which the blocks are disposed in the predetermined direction is also called metamorphosis.

Utilization of metamorphosis as mentioned above may allow indication of a message by utilizing both the form of the block concerned and a change in the form of the block in the finally obtained photo-mosaic image.

For example, in the case that the outline of a predetermined living thing is expressed using the form of each block, the process of growth of the living thing may be expressed by changing the forms of the blocks arrayed in a predetermined direction in accordance with the positions at which the blocks are disposed. Likewise, for example, examples in which the process of changing from the face of a father to the face of a child or from the face of a person when he was a child to the face of the person when he has grown up is expressed by changing the forms of the blocks and the process of changing from a building before rebuilt to the building after rebuilt is expressed by changing the forms of the blocks may be conceived of.

The range within which the message is expressed may be further increased and the artistic property of the photo-mosaic may be further improved by gradually changing the forms of the blocks such that the blocks are arrayed while gradually changing the forms of the blocks so as to initially express the past shape of a certain thing and then to finally express the current shape thereof.

FIG. 6 is a diagram illustrating an example of the metamorphosis as in FIG. 5. In the example illustrated in FIG. 6, a production target image is divided into a plurality of blocks of different forms. On the production target image illustrated in FIG. 6, the block on the lowermost end side exhibits the form of the outline of the face of a demon-like object, then the form of each block gradually changes and the block finally exhibits the form of a horse-like object as the block shifts from the lowermost end side toward the uppermost end side.

Figure 3:
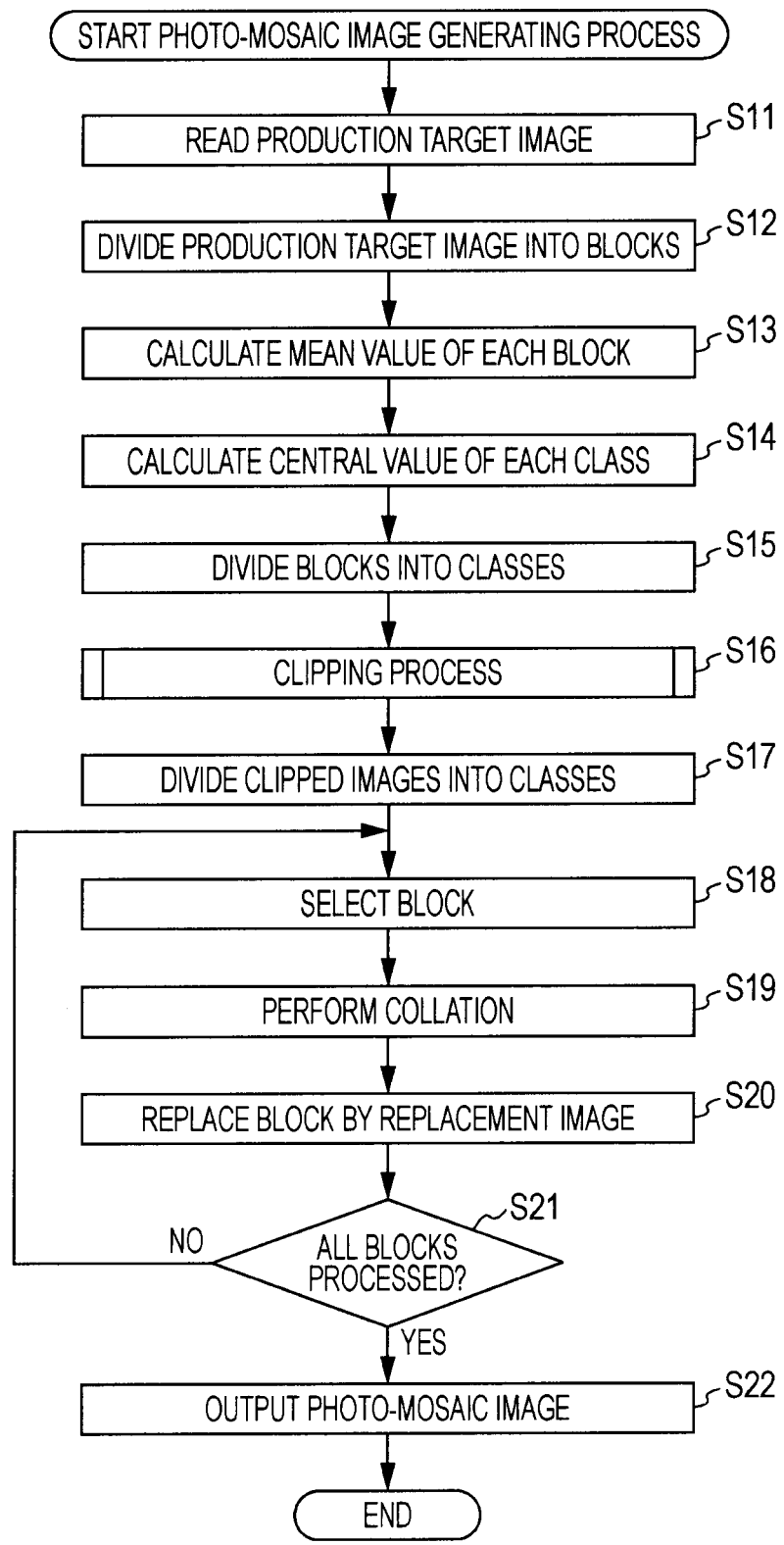
FIG. 3 is a flowchart illustrating an example of a process of generating a photo-mosaic image.

Returning to the explanation of the flowchart illustrated in FIG. 3, the dividing unit 24 divides the production target image into a plurality of blocks and supplies the respective blocks to the mean value calculating unit 25.

At step S13, the mean value calculating unit 25 calculates a mean value of pixels values of pixels included in each of the blocks supplied from the dividing unit 24 and supplies the respective blocks and the block-based mean values (the mean values of the pixel values of pixels in respective blocks) to the central value calculating unit 26. For example, respective pixels in each production target image have pixels values of R (red), G (green) and B (blue) components and the means value is calculated for each of the R, G and B components. Incidentally, in order to reduce the number of arithmetic operations to be executed, pixels in each block may be thinned out so as to calculate the mean value in the block out of which the pixels have been thinned.

At step S14, the central value calculating unit 26 calculates the central value of each class by using the means values in the respective blocks supplied from the means value calculating unit 25.

For example, in the case that the number of classes is defined to be "k" in advance, the central value calculating unit 26 calculates the central value of each of "k" classes by the k-means method. Specifically, first, the central value calculating unit 26 determines the initial value of the central value of each class. For example, the central value is afforded to each of the of R, G and B components.

Then, the central value calculating unit 26 calculates a distance between the central value of each class and the mean value in each block such that classification may be executed on the basis of the calculated distance. In the example illustrated in the drawing, each block of the production target image is classified so as to belong to the class of the central value with which the closest (shortest) distance is calculated relative to the mean value of the pixel values of the pixels in the block. The distance is calculated by obtaining the sum of squares of differential absolute values of pixel values of the respective R, G and B components between the mean value and the central value or by weighted-adding the differences of the pixel values of the respective components between the mean value and the central value. That is, the distance between the mean value in each block and the central value of each class has a value indicating how much the average color (mean value) of the block is similar to the representative color (central value) of the class.

When the block is classified to belong to one of classes, the central value calculating unit 26 calculates a new central value of each class. That is, the mean value of the pixel values of the pixels in the block which belongs to the class concerned is calculated and the obtained mean value is defined as the new central value. The respective blocks are classified so as to belong to the corresponding classes on the basis of the obtained central values in the above mentioned manner, a process of updating the central value of each class is executed the prescribed number of times and then the central value obtained as a result of execution of the updating process is set as the final central value of each class.

The central value calculating unit 26 which has obtained the central value of each class supplies the obtained central value of each class to the classifying unit 29 and supplies the obtained central value of each class, the mean value in each block and the block-divided production target image to the classifying unit 27.

At step S15, the classifying unit 27 calculates the distance between the mean value in each block and the central value of the corresponding class using the mean values and the central values supplied from the central value calculating unit 26 and classifies each block so as to belong to one of "k" classes. Incidentally, distance calculation and block classification are carried out by performing the same processes as those performed using the central value calculating unit 26. That is, the distance is calculated by obtaining the sum of squares of the differential absolute values of the pixel values of the respective components between the mean value and the central value and each block is classified so as to belong to the class of the central value with which the shortest distance is calculated relative to the mean value in the corresponding block.

The classifying unit 27 which has classified each block of the production target image so as to belong to the corresponding class supplies a result of classification performed and the block-divided production target image to the replacement image determining unit 31.

At step S16, the clipping unit 28 performs a clipping process to generate each clipped image and supplies the clipped image to the classifying unit 29. That is, the clipping unit 28 clips the region of the subject on the material image recorded in the image database recording unit 22 after the form of the block indicated by the block form information recorded in the clipped form memory 23 to generate the clipped image. Details of the clipping process will be described later.

In the case that as the block indicated by the block form information, there exist a plurality of blocks of forms and sizes which are different from one another, clipped images of different forms and sizes are respectively generated. For example, in the case that triangular and rectangular blocks are indicated in the block form information, a clipped image obtained by clipping one material image in the rectangular form and a clipped image obtained by clipping the same material image in the rectangular form are generated from the single material image.

At step S17, the classifying unit 29 classifies the clipped image supplied from the clipping unit 28 so as to belong to one of the classes using the central value of each class supplied from the central value calculating unit 26.

Specifically, the classifying unit 29 calculates a mean value of the pixel values of pixels in the clipped image as the characteristic amount of the first color-related characteristic of the clipped image and calculates a distance between the calculated mean value and the central value of each class. The distance is calculated in the same manner as that of the calculation executed using the classifying unit 27. Incidentally, in order to reduce the number of arithmetic operations to be performed, pixels in the clipped image may be thinned out so as to calculate the mean value in each clipped image (the mean value of the pixel values of the pixels in each clipped image) out of which the pixels have been thinned.

Next, the classifying unit 29 classifies the clipped image so as to belong to the class of the central value with which the distance obtained is less than a predetermined threshold. For example, if both the distance between the mean value in a predetermined clipped image and the central value of a class 1 and the distance between the mean value in the clipped image and the central value of a class 2 are less than the threshold value, the clipped image will be classified so as to belong to both the classes 1 and 2.

On the other hand, in the case that both the distances between the mean value in the clipped image and the central value of the class 1 and between the mean value and the central value of the class 2 are not less than the threshold value, the clipped image is not classified to any class and hence is not used for generation of the photo-mosaic image. That is, the average color of the clipped image is not similar to the color of any class and hence the clipped image is regarded not to belong to any class. Because, if a photo-mosaic image is generated by replacing the block concerned by the clipped image of the color which is not similar to the color of any class, the quality of the generated photo-mosaic image will be degraded.

Incidentally, the threshold value of the distance may be changed as the case may be and one clipped image may be classified so as to belong to one class or not to belong to any class. In the above mentioned case, the clipped image will be classified so as to belong to the class of the central value with which the shortest distance is obtained in the classes of the central values with which the distances are less than the threshold value.

The classifying unit 29 which has classified each clipped image so as to belong to the corresponding class supplies a result of classification executed and the clipped images to the clipped image memory 30 to be recorded therein.

At step S18, the replacement image determining unit 31 selects one block on the production target image supplied from the classifying unit 27.

At step S19, the replacement image determining unit 31 collates the selected block with the clipped image on the basis of the clipped images recorded in the clipped image memory 30 and the result of classification of each clipped image to select one clipped image to be allocated to the selected block.

Specifically, the replacement image determining unit 31 extracts one clipped image which has the same form and size as the block to be processed, which belongs to the same class as the block and which is not yet selected as the replacement image by which another block in the class is replaced from among the clipped images recorded in the clipped image memory 30.

A clipped image the similarity to the block of which is low and the possibility to be adopted as the replacement image of which is low may be excluded by extracting only the clipped image which belongs to the same class as the block to be processed to be used for replacement in the above mentioned manner and hence a suitable replacement image may be more rapidly selected. In addition, repetitive use of one clipped image may be avoided by excluding the clipped image which has been selected once as the replacement image for another block even when the clipped image belongs to the same class as the block to be processed and hence the photo-mosaic image of higher quality may be obtained.

In the case that the clipped image has been extracted in the above mentioned manner, the replacement image determining unit 31 collates each of the extracted clipped images with the block to be processed. That is, the replacement image determining unit 31 calculates the following formula (1) to obtain a difference $\Delta C$ between the pixel in the block and the pixel in the clipped image situated at the same position as the pixel in the block.

$$\Delta C = \sqrt{\left(2 + \frac{r}{256}\right) \times \Delta R^2 + 4 \times \Delta G^2 + \left(2 + \frac{255-r}{256}\right) \times \Delta B^2} \quad (1)$$

Incidentally, r, $\Delta R$, $\Delta G$ and $\Delta B$ in the formula (1) are respectively obtained from the following formulae (2) to (5).

$$r = \frac{C1(R) + C2(R)}{2} \quad (2)$$

$$\Delta R = C1(R) - C2(R) \quad (3)$$

$$\Delta G = C1(G) - C2(G) \quad (4)$$

$$\Delta B = C1(B) - C2(B) \quad (5)$$

Incidentally, in the formulae (2) to (5), C1(R), C1(G) and C1(B) respectively indicate the pixel values of the R, G and B components of the pixels in the block concerned. Likewise, in the formulae (2) to (5), C2(R), C2(G) and C2(B) respectively indicate the pixel values of the R, G and B components of the pixels in the clipped image concerned.

The difference $\Delta C$ which is obtained in the above mentioned manner exhibits a value obtained by weighted-adding the square value of the difference in each component between the pixel in the block of the production target image and the pixel in the clipped image. That is, the difference $\Delta C$ is a distance between the pixel in the block in the production target image and the pixel in the clipped image.

Therefore, it may be said that the smaller the value of the difference $\Delta C$ is, the more the color of the pixel in the block of the production target image and the color of the pixel of the clipped image which are at the corresponding positions are similar to each other. The replacement image determining unit 31 obtains the difference $\Delta C$ between each two pixels in the block and the clipped image to calculate the sum $\Sigma\Delta C$ of the differences $\Delta C$. It may be said that the smaller the value of the sum $\Sigma\Delta C$ is, the more the structure (distribution) of the color of the clipped image is similar to that of the block to be processed.

Therefore, the photo-mosaic image of higher quality may be obtained by adopting a clipped image which is smaller in the sum $\Sigma\Delta C$ of the differences as the replacement image for the block to be processed. Accordingly, the replacement image determining unit 31 selects the clipped image having the smallest sum $\Sigma\Delta C$ value from among the clipped images and supplies the selected clipped image to the image replacing unit 32 as the replacement image. The replacement image determining unit 31 also supplies the block-divided production target image to the image replacing unit 32.

Alternatively, in the case that a clipped image to be collated with the block concerned is extracted, it may be set such that the clipped image which has been used once as the replacement image in one class is not used again only in the vicinity of the block (for example, in the vicinity of the block 24) where the clipped image has been used once, instead of setting such that it is not used again any more. As a result, the quality of the photo-mosaic image may be prevented from being degraded.

In the case that the number of the clipped images belonging to one class is smaller than that of the blocks belonging to the same class as the above and all the clipped images have been used as the replacement images, it may be set such that all the clipped images belonging to the class are regarded again as processing objects. That is, all the clipped images are regarded again as processing objects and the replacement images for the succeeding blocks are sequentially selected from among these clipped images. In the above mentioned case, the clipped which has been selected again as the replacement image either may be excluded from the objects to be selected as the replacement images for the succeeding blocks or may not be excluded from the objects to be selected.

In addition, as for a process of selecting a clipped image used as a replacement image, any process may be adopted as long as it is a process of selecting a clipped image which is similar to the block to be processed, that is, a clipped image which is similar to the block in terms of the representative color and the distribution (structure) of the color in the case that the second color-related characteristic is used as an index.

In addition, for example, in order to reduce the number of arithmetic operations executed to obtain the sum EAC of the differences, the difference $\Delta C$ between respective pixels may be calculated after the pixels in the block and the clipped image have been thinned out or the block and the clipped image have been minified at the same rate by executing the minifying process. Incidentally, the minifying process may be executed, for example, by a bilinear method, a bi-cubic method or a nearest neighbor method.

Further, the block and the clipped image which are to be processed may be deformed to a predetermined form such as the rectangle by using a projective function or by redistributing the pixels and then the deformed block and clipped image may be subjected to collation (the arithmetic operation of the sum $\Sigma\Delta C$).

In the above mentioned case, deformation to the predetermined form may include minification or magnification of the image. For example, if the block and the clipped image are deformed to rectangular images and then a collating process is executed on the rectangular images, processing will be more facilitated and collation will be executed more rapidly than would be allowed when images of arbitrary forms are to be processed.

In addition, collation may be executed by using a block-including rectangular region on a production target image and a rectangular region which includes a region which is clipped as a clipped image on a material image. In the above mentioned case, in order to reduce the number of arithmetic operations to be executed, the rectangular regions to be processed may be minified. Incidentally, both in the cases that the rectangular regions are used as they are and the rectangular regions are used after minified, collation may be executed using only the pixels within the region(s) of the block and/or the clipped image in the rectangular region(s) or collation may be executed using all the pixels within the rectangular regions.

In the case that the block-divided production target image and the replacement image for the block to be processed are supplied from the replacement image determining unit 31 to the image replacing unit 32 in the above mentioned manner, the process proceeds from step S19 to step S20.

At step S20, the image replacing unit 32 replaces the block to be processed on the production target image by the replacement image supplied from the replacement image determining unit 31.

At step S21, the image processing device 11 judges whether all the blocks on the production target image have been processed. For example, in the case that all the blocks have been replaced by the replacement images and hence the photo-mosaic image has been generated, it is judged that all the blocks have been processed.

At step S21, in the case that it is judged that all the blocks are not yet processed, the process returns to step S18 and the above mentioned processes are executed again. That is, the next block is selected and the block is replaced by the corresponding replacement image.

On the other hand, at step S21, in the case that it is judged that the all the blocks have been processed, at step S22, the image replacing unit 32 outputs the photo-mosaic image obtained by replacing the blocks by the corresponding replacement images to the display control unit 33. Then, the photo-mosaic image is displayed on the display unit 34 under the control of the display control unit 33 and execution of the process of generating the photo-mosaic image is terminated.

The image processing device 11 clips the region of the subject on the material image conforming to the form and size of the block concerned as the clipped image and replaces the respective blocks by the clipped images on the basis of the results of classification of the respective blocks and the clipped images to generate the photo-mosaic image in the above mentioned manner.

The photo-mosaic image of higher quality may be obtained by the more simplified process by collating the block to be processed with the clipped image which has been classified so as to belong to the same class as the block to generate the photo-mosaic image in the above mentioned manner.

Incidentally, although in the above mentioned example, it has been described the blocks on the production target image and the clipped images are classified so as to belong to the corresponding classes and one clipped image to be used as the replacement image is selected from among the clipped images which belong to the same class as the block to be processed, it may set so as not to perform classification. In the above mentioned case, the replacement image determining unit 31 collates each of blocks which have been divided using the dividing unit 24 with each of all the clipped images of the same form and size as those of the block to select one clipped image to be used as the replacement image.

Description of Clipping Process

Next, the clipping process corresponding to the process at step S16 in FIG. 3 will be described with reference to an example of a flowchart in FIG. 7.

At step S51, the subject detecting unit 61 reads a material image out of the image database recording unit 22. Then, at step S52, the subject detecting unit 61 detects a subject from the material image by executing processing such as object recognition on the basis of the read material image.

For example, the subject detecting unit 61 records in advance the characteristic amounts of characteristics that the average image of specific subjects (objects) such as human faces has. Here, it is supposed that the characteristics that the average image has are, for example, a relative distance between characteristic points on the image and a luminance distribution. Then, the subject detecting unit 61 extracts the characteristic amount of the characteristic concerned from the material image and compares the extracted characteristic amount with the characteristic amount of each subject which is recorded in advance, thereby detecting the subject from the material image.

The subject may be detected from the material image by executing processing such as template matching or a region which is designated by a user may be used as the region of the subject.

The subject detecting unit 61 which has detected the region of the subject from the material image read out of the image database recording unit 22 supplies a result of detection executed and the material image to the noise detecting unit 62.

At step S53, the noise detecting unit 62 detects noise such as smear noise from the material image supplied from the subject detecting unit 61 and supplies a result of detection executed, and the material image and the result of detection of the subject supplied from the subject detecting unit 61 to the noise removing unit 63. As an alternative, only the region of the subject on the material image may be subjected to noise detection by using the result of detection of the subject.

At step S54, the noise removing unit 63 generates a filter for removing the detected noise using the result of noise detection supplied from the noise detecting unit 62 and removes the noise from the material image supplied from the nose detecting unit 62 by executing a filtering process using the filter. Then, the noise removing unit 63 supplies the noise-removed material image (the material image from which the noise has been removed) and the result of subject detection supplied from the noise detecting unit 62 to the fuzz detecting unit 64.

At step S55, the fuzz detecting unit 64 detects fuzz (blurring) caused by an unsteady hold and fuzz caused by defocusing of an optical system from the material image supplied from the noise removing unit 63.

For example, the fuzz caused by the unsteady hold is detected by Cepstrum analysis. That is, the fuzz detecting unit 64 performs fast Fourier transformation on the material image and performs logarithmic operation and inverse fast Fourier transformation on an image which has been obtained by performing the fast Fourier transformation on the material image to generate a Cepstrum image and a spot spread function is obtained on the basis of the Cepstrum image. The spot spread function indicates the luminance distribution observed when an ideal spot image has been made fuzzy caused by blurring or the like, that is, the locus of the blurring exerted onto an imaging device that takes the image concerned. Therefore, the distance over which the outline of the subject on the material image has been scumbled by the blurring, that is, the extent of the fuzz may be found from the spot spread function.

As an alternative, only the region of the subject on the material image may be used as an object of fuzz detection by using the result of detection of the subject.

The fuzz detecting unit 64 which has detected the fuzz from the material image supplies a result of detection performed and the result of detection of the subject and the material image supplied from the noise removing unit 63 to the fuzz removing unit 65.

At step S56, the fuzz removing unit 65 removes the fuzz from the material image supplied from the fuzz detecting unit 64 on the basis of the result of detection of the fuzz supplied from the fuzz detecting unit 64. For example, the fuzz removing unit 65 generates a filter having an inverse characteristic of the characteristic of the fuzz from the result of detection of the fuzz and performs a filtering process on the material image using the filter to remove the fuzz from the material image.

The fuzz removing unit 65 supplies the fuzz-removed material image (the material image form which the fuzz has been removed) and the result of detection of the subject sent from the fuzz detecting unit 64 to the subject region clipping unit 66.

Incidentally, in the case that the noise and fuzz on the material image have been increased to certain extents, it may sometimes occur that the quality of the material image is rather degraded as a result of removal of the noise and fuzz. Therefore, in order to prevent the quality of the photo-mosaic image from being degraded, in the case that the extents of the noise and fuzz on a material image have been increased beyond predetermined extents, it may be allowed not to use the material image concerned for generation of a clipped image.

In addition, in the case that noise and fuzz have been detected from the region of a subject on a material image and the extents of the noise and fuzz are more than the predetermined extents, another subject may be detected from the material image, noise and fuzz may be removed from another subject and then the noise-and-fuzz-removed subject may be used for generation of the clipped image.

At step S57, the working unit 71 of the subject region clipping unit 66 works the material image supplied from the fuzz removing unit 65 conforming to the form and size of the block concerned indicated by the block form information recorded in the clipped form memory 23.

Specifically, the working unit 71 performs a working process such as a minifying process, a magnifying process, a deforming process (deformation of the image form) and a rotating process on the material image such that the entire subject may put in the block in the case that an almost central part of the region of the subject on the material image is aligned with the central position of the block to superpose the region of the subject on the block. For example, in the case that the subject is too small as compared with the size of the block, the magnifying process is performed on the material image as the working process such that the subject may put in the block and the subject may have an appropriate size relative to the size of the block. In the above mentioned case, the region of the subject on the material image is specified from the result of detection of the subject supplied from the fuzz removing unit 65.

At step S58, the subject region clipping unit 66 clips a region including the subject from the material image which has been worked using the working unit 71 after the form of the block with reference to the block form information recorded in the clipped form memory 23 to generate the clipped image. That is, the region which includes the subject on the worked material image and has the size and form which are the same as those of the block indicated by the block form information is clipped as the clipped image. As a result, the clipped image which includes the entire subject and has the same size and form as the block is obtained.

Incidentally, in the case that the subject is slightly larger than the block to such an extent that the subject slightly extends beyond the frame of the block or is slightly smaller than the block, no particular working process may be performed on the material image. Likewise, in the case that the subject just puts in the frame of the block, no particular working process may be performed on the material image. In the case that blocks having a plurality of forms or sizes are indicated by the block form information, respective clipped images having the same forms or sizes as the blocks are generated from a material image to be used for generation of clipped images with respect to the individual blocks having different forms or sizes.

The subject region clipping unit 66 which has generated the clipped image from the material image supplies the clipped image to the classifying unit 29.

At step S59, the clipping unit 28 judges whether all the material images recorded in the image database recording unit 22 have been processed. For example, in the case that the clipped images have been generated from all the material images, it is judged that all the material images have been processed.

At step S59, in the case that it is judged that all the material images are not yet processed, the process returns to step S51 and above mentioned processes are executed again. That is, the next material image is set as a processing object and a clipped image is generated from the next material image.

On the other hand, in the case that it is judged that all the material images have been processed at step S59, execution of the clipping process is terminated and the process proceeds to step S17 in FIG. 3.

The clipping unit 28 detects the subject from the material image and appropriately works the material image such that the subject on the material image may put in the block to generate the clipped image in the above mentioned manner.

A photo-mosaic image of higher quality may be obtained by working the material image such that the subject may put in the block and clipping the region of the subject on the material image after the form of the block to be used as the clipped image as described above.

That is, the almost entire part of the subject may be typically included in the clipped image obtained by working the material image such that the subject may put in the block and then clipping one of the regions on the material image as the clipped image.

Therefore, if the clipped image which has been generated in the above mentioned manner is used as a replacement image, a more attractive photo-mosaic image formed by arranging the replacement images in which the subject just puts in the frame of the image typically will be obtained regardless of the form of the block concerned.

In addition, all the clipped images are generated such that the subject may just put in each clipped image, so that a clipped image which may be hard to be used as a replacement image may be rarely generated. Thus, repetitive use of one clipped image for lack of the number of clipped images used may be avoided and hence a more attractive photo-mosaic image may be obtained.

As described above, even in the case that a photo-mosaic image is generated by dividing a production target image into blocks of arbitrary forms, a photo-mosaic image of higher quality may be obtained by working a material image such that the subject may put in the block concerned and then generating a clipped image.

Second Embodiment

Configuration of Image Processing Device

Although the example in which one clipped image used as a replacement image is selected from among the clipped images having the same form and size as the block to be processed and belonging to the same class as the block has been described, only a clipped image which is related to the form of a block concerned may be selected as a candidate for the replacement image, instead of classification of the clipped images.

That is, a clipped image to be used as the replacement image for the block to be processed is selected from among clipped images having the same form and size as the block to be processed and including subjects related to the form of the block to be processed.

Figure 8:
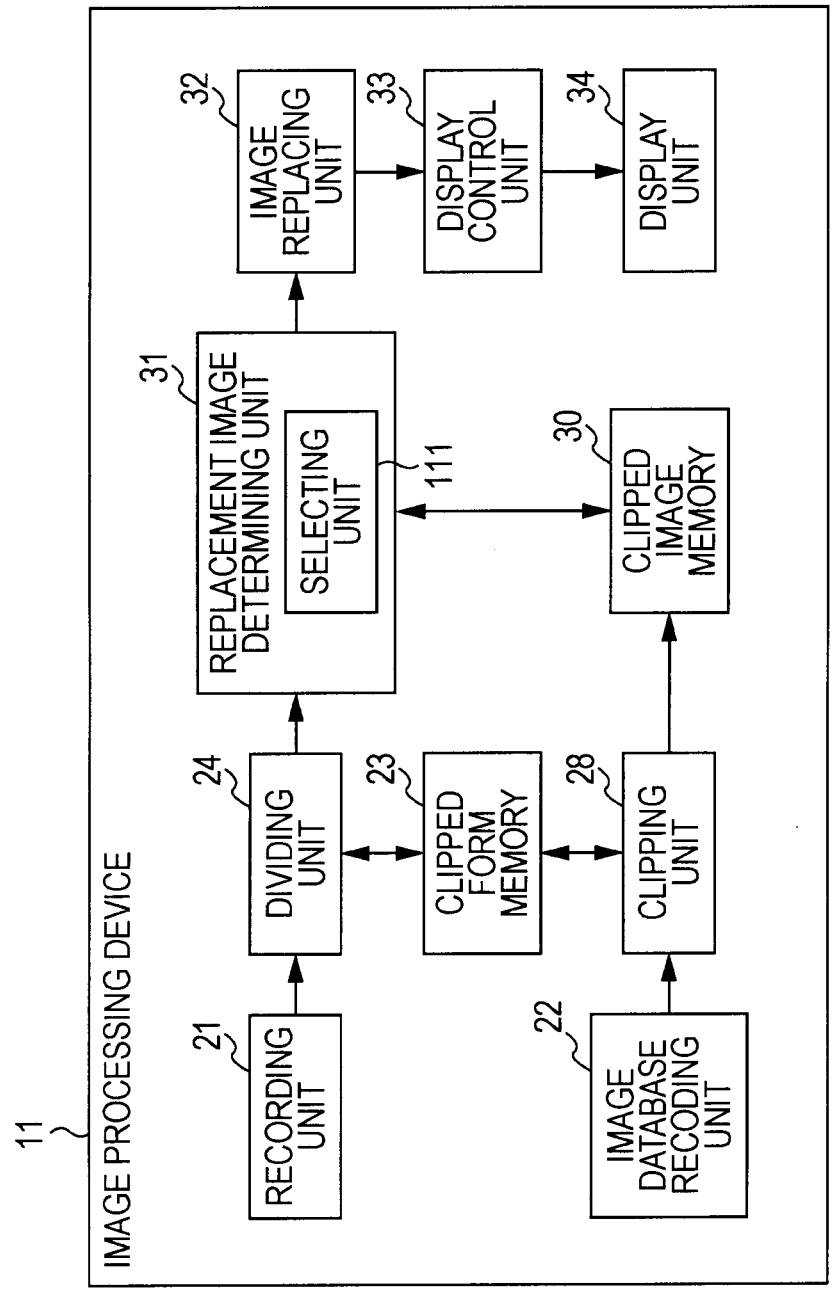
FIG. 8 is a diagram illustrating another example of a configuration of an image processing device.

In the above mentioned case, the image processing device 11 is configured, for example, as illustrated in FIG. 8. Incidentally, in FIG. 8, the same numerals are assigned to the parts corresponding to those in FIG. 1 and hence description thereof will be omitted as the case may be.

The image processing device 11 illustrated in FIG. 8 differs from the image processing device 11 in FIG. 1 in that a selecting unit 111 is freshly included in the replacement image determining unit 31 and the mean value calculating unit 25, the central value calculating unit 26, the classifying unit 27 and the classifying unit 29 are not installed and is the same as the device 11 in FIG. 1 with respect to other points.

In the image processing device 11 illustrated in FIG. 8, a production target image which has been divided into a plurality of blocks using the dividing unit 24 is supplied from the diving unit 24 to the replacement image determining unit 31. A clipped image which has been generated using the clipping unit 28 is supplied from the clipping unit 28 to the clipped image memory 30. Incidentally, in the example of the image processing device 11 illustrated in FIG. 8, classification is not performed on the block and the clipped image.

In addition, to a material image recorded in the image database recording unit 22, tag information indicating the kind of the subject of the material image is added. For example, in the case that the subject on the material image is a fish, the tag information indicates that the subject is the fish.

Further, in the case that the material image is an image which conforms to the standard such as Exif (Exchangeable Image File Format), the title of the image in additional information (Exif information) added to the material image may be used as the tag information.

The subject region clipping unit 66 included in the clipping unit 28 adds the tag information which is added to the material image to the clipped image which has been generated and supplies the tag-information-added clipped image to the clipped image memory 30.

The selecting unit 111 included in the replacement image determining unit 31 holds therein related information indicating a subject conforming to a theme which is made related to the form of the block concerned in advance. For example, in the case that the form of the block indicates the outline of a fish, the subjects indicated by the related information are defined as the "fish" and the "sea" and clipped images in which the fish and the sea are shown as the subjects are set as candidates for the replacement image by which the block will be replaced.

The selecting unit 111 selects one clipped image which is set as the candidate for the replacement image by which the block to be processed will be replaced from among clipped images recorded in the clipped image memory 30 by using the related information held therein. That is, the clipped image which includes the subject which is related to the form of the block to be processed is selected as the candidate for the replacement image.

The replacement image determining unit 31 collates the block to be processed with each of the clipped images selected using the selecting unit 111 to select one clipped image to be used as the replacement image.

Description of Process of Generating Photo-Mosaic Image

Next, a process of generating a photo-mosaic image executed using the image processing device 11 illustrated in FIG. 8 will be described with reference to an example of a flowchart illustrated in FIG. 9.

Incidentally, the processes at step S81 to step S84 are the same as those at step S11, step S12, step S16 and step S18 in the example of the flowchart illustrated in FIG. 3 and hence description thereof will be omitted.

That is, one production target image supplied from the recording 21 is divided into blocks on the basis of the block form information recorded in the clipped form memory 23 using the dividing unit 24 and each block is supplied to the replacement image determining unit 31. In addition, the region of a subject on one material image supplied from the image database recording unit 22 is clipped on the basis of the block form information recorded in the clipped form memory 23 using the clipping unit 28 to be generated as a clipped image and the clipped image is then recorded in the clipped image memory 30. Incidentally, the tag information which is added in advance to the material image is added to the clipped image.

At step S85, the selecting unit 111 selects one clipped image which is related to the form of the block to be processed as a candidate for the replacement image with reference to the related information held therein.

That is, the selecting unit 111 recognizes the form of the block to be processed. Then, the selecting unit 111 selects one clipped image having the tag information in which information indicative of the subject indicated by the related information of the recognized form of the block to be processed is included and having the same form and size as the block to be processed from among the clipped images recorded in the clipped image memory 30.

For example, in the case that it is recognized that the form of the block to be processed indicates the outline of the fish as a result of recognition of the form of the block to be processed, related information which is specified from the form (fish) of the block is referred to. Then, if the subjects indicated by the related information are the "fish" and the "sea", one clipped image to which tag information indicating that the subject is the "fish" or the "sea" is added is selected as the candidate for the replacement image by which the block to be processed will be replaced.

Therefore, each of the clipped images selected using the selecting unit 111 as the candidates for the replacement image is collated with the block to be processed and then one clipped image which is the most similar to the block to be processed in terms of the second color-related characteristic is selected as the replacement image from among the above mentioned clipped images. Thus, the subject in the clipped image (the replacement image) which has been selected in the above mentioned manner is made related to the form of the block to be processed.

On the other hand, for example, it is supposed that a block having the form of the outline of a fish and a block having the form of the outline of a bird are included in one production target image. In the above mentioned case, a clipped image including a subject related to the fish and having the form of the fish is allocated to the block having the form of the outline of the fish and a clipped image including a subject related to the bird and having the form of the bird is allocated to the block having the form of the outline of the bird.

After the clipped image related to the form of the block has been selected, the processes at step S86 to step S89 are executed to terminate execution of the photo-mosaic image generating process. However, these processes are the same as those at step S19 to step S22 in the example of the flowchart illustrated in FIG. 3 and hence description thereof will be omitted.

The image processing device 11 selects one clipped image including the subject related to the form of the block to be processed as the replacement image from among the clipped images having the same form and size as the block to be processed in the above mentioned manner.

Selection of a clipped image which includes a subject related to the form of the block concerned as a replacement image in the above mentioned manner may allow to express a message with respect to a desired theme not only by using the subject included in the clipped image or the form itself of the clipped image but also by combining the subject with the form of the clipped image. As a result, the artistic property of the photo-mosaic image may be further improved.

Incidentally, the example in which the tag information indicative of the subject is added in advance to the material image has been described. As one alternative, the selecting unit 111 may be configured to extract the subject from the clipped image. In the above mentioned case, the tag information is not added to the clipped image. The selecting unit 111 extracts (identifies) the subject from the clipped image by object recognition, and in the case that a result of identification shows the subject which is indicated by the related information on the form of the block to be processed, adopts the clipped image as the candidate for the replacement image.

As another alternative, related information on each block may be included in advance in the block form information and the respective blocks and related information on these blocks may be supplied from the dividing unit 24 to the replacement image determining unit 31. In the above mentioned case, the selecting unit 111 may only refer to the related information on the block concerned, without executing a process of recognizing the form of the block.

Third Embodiment

Configuration of Image Processing Device

In addition, a clipped image may be generated using only a material image including a subject related to the form of a block concerned for each block form.

Figure 10:
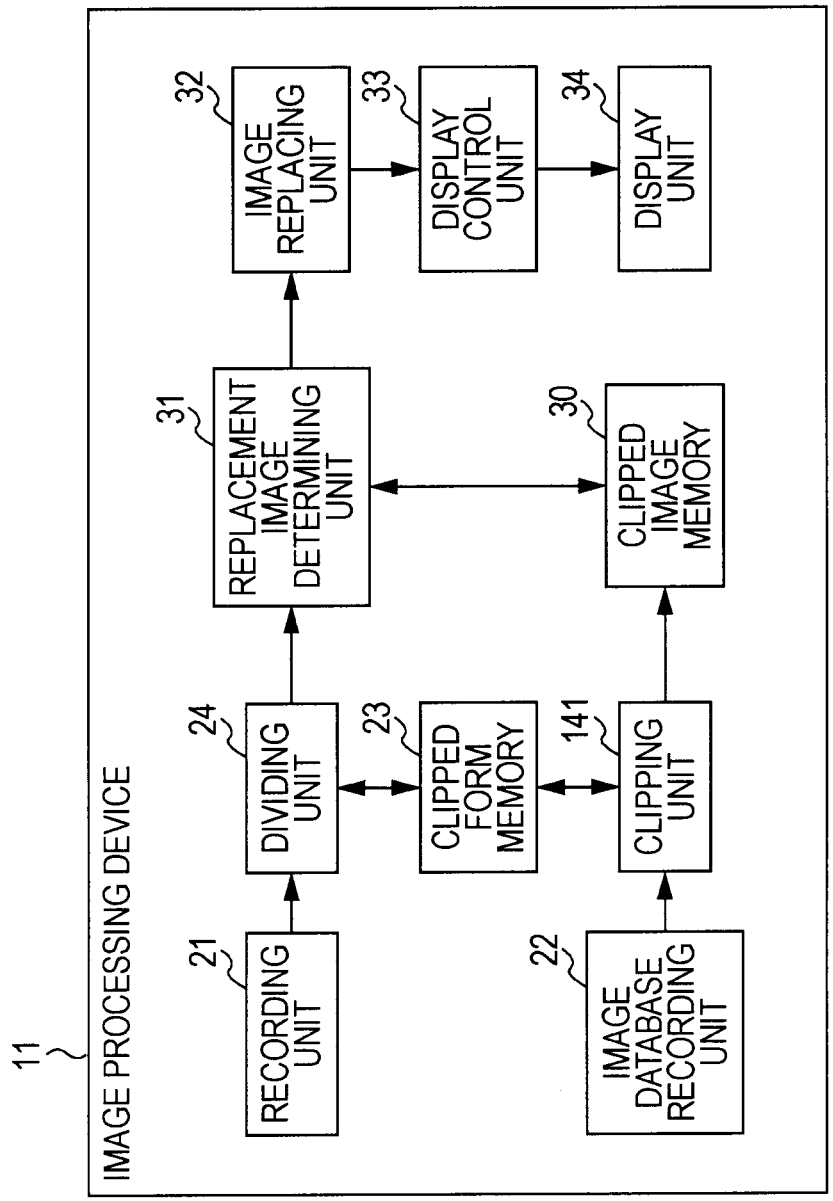
FIG. 10 is a diagram illustrating a further example of a configuration of an image processing device.

In the above mentioned case, the image processing device 11 is configured, for example, as illustrated in FIG. 10. Incidentally, in FIG. 10, the same numerals are assigned to the parts corresponding to those in the example illustrated in FIG. 8 and hence description thereof will be omitted.

The image processing device illustrated in FIG. 10 differs from the image processing device 11 illustrated in FIG. 8 in that the selecting unit 111 is not installed in the replacement image determining unit 31 and another clipping unit 141 is included in place of the clipping unit 28 and is the same as the device 11 illustrated in FIG. 8 with respect to other points.

The clipping unit 141 acquires tag-information-added material images from the image database recording unit 22 and generates a clipped image using only a material image including a subject related to the block form which is indicated by the block form information recorded in the clipped image memory 23 in the acquired material images.

Configuration of Clipping Unit

Figure 11:
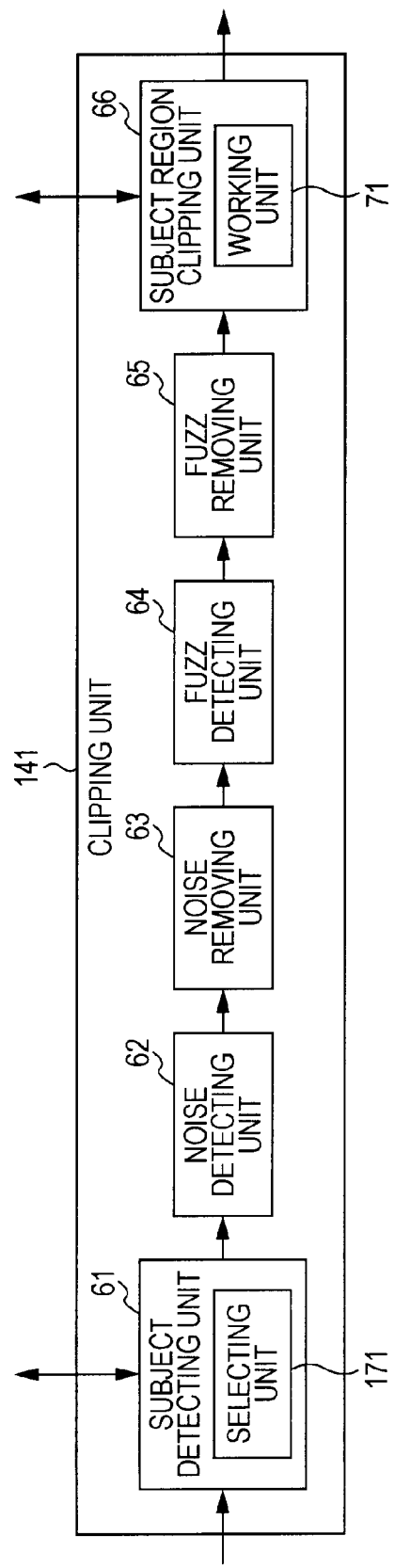
FIG. 11 is a diagram illustrating another example of a configuration of a clipping unit.

The clipping unit 141 is configured in more detail as illustrated in FIG. 11. Incidentally, in FIG. 11, the same numerals are assigned to the parts corresponding to those in FIG. 2 and hence description thereof will be omitted.

In the clipping unit 141, a selecting unit 171 is freshly included in the subject detecting unit 61. The clipping unit 141 is configured in the same manner as the clipping unit 28 illustrated in FIG. 2 with respect to other points.

The selecting unit 171 holds therein in advance related information indicating the subject conforming to the theme which is related to the form of each block and selects one material image related to the form of the block indicated by the block form information from among acquired material images using the related information. The clipping unit 141 generates a clipped image by using only the material image selected using the selecting unit 171.

Description of Process of Generating Photo-Mosaic Image

Next, a process of generating a photo-mosaic image executed using the image processing device 11 illustrated in FIG. 10 will be described with reference to an example of a flowchart illustrated in FIG. 12.

The processes at step S131 and step S132 are the same as those at step S81 and S82 and hence description thereof will be omitted.

At step S133, the clipping unit 141 executes a clipping process to generate a clipped image from a material image which has been read out of the image database recording unit 22 and supplies the generated clipped image to the clipped image memory 30 to be recorded into the memory 30.

Figure 13:
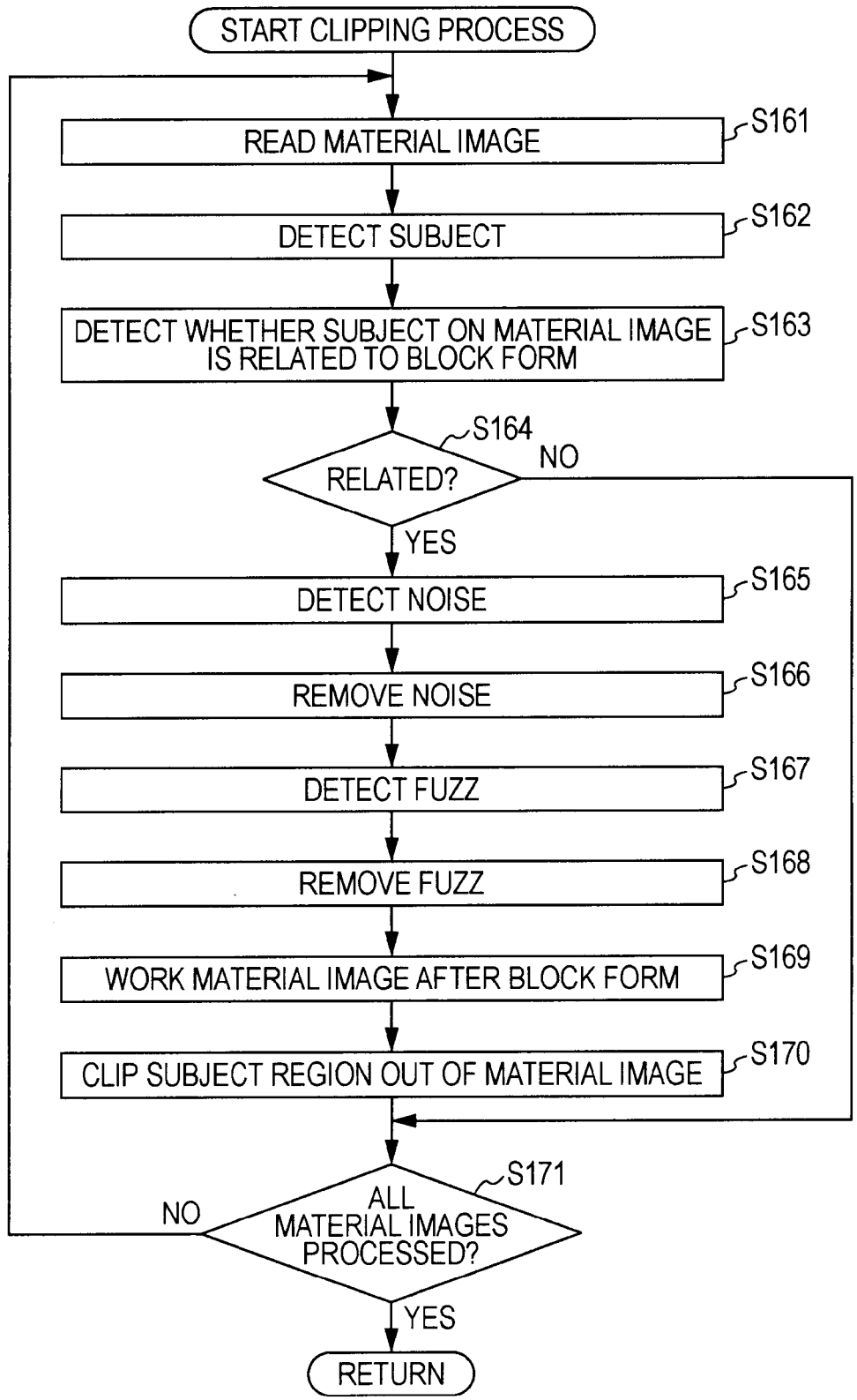
FIG. 13 is a flowchart illustrating another example of a clipping process.

Next, the clipping process corresponding to the process executed at step S133 will be described with reference to an example of a flowchart illustrated in FIG. 13. Incidentally, the processes at step S161 and step S162 are the same as those at step S51 and step S52 in the example of the flowchart illustrated in FIG. 7 and hence description thereof will be omitted. That is, the subject detecting unit 61 reads one material image out of the image database recording unit 22 and detects a subject from the material image.

At step S163, the selecting unit 171 detects, with reference to the block form information recorded in the clipped form memory 23, whether the subject detected from the material image is related to the form of the block indicated by the recorded block form information.

For example, the selecting unit 171 refers to related information which is specified from the form of the block indicated by the block form information recorded in the clipped form memory 23, in pieces of related information which are held therein in advance. Then, the selecting unit 171 compares the subject indicated by the related information with the subject indicated by tag information added to the material image to detect whether the form of the block indicated by the block form information is related to the subject on the material image.

At step S164, the selecting unit 171 judges whether the form of the block is related to the subject on the material image on the basis of a result of detection executed as to relation between the form of the block and the subject on the material image. For example, in the case that information indicating the same subject "fish" is included both in the related information and the tag information, it is judged to have relation (between the form of the block and the subject on the material image).

At step S164, in the case that it is judged to have relation, the process proceeds to step S165. Then, the processes at step S165 to step S170 are executed to generate one clipped image from the material image.

Figure 7:
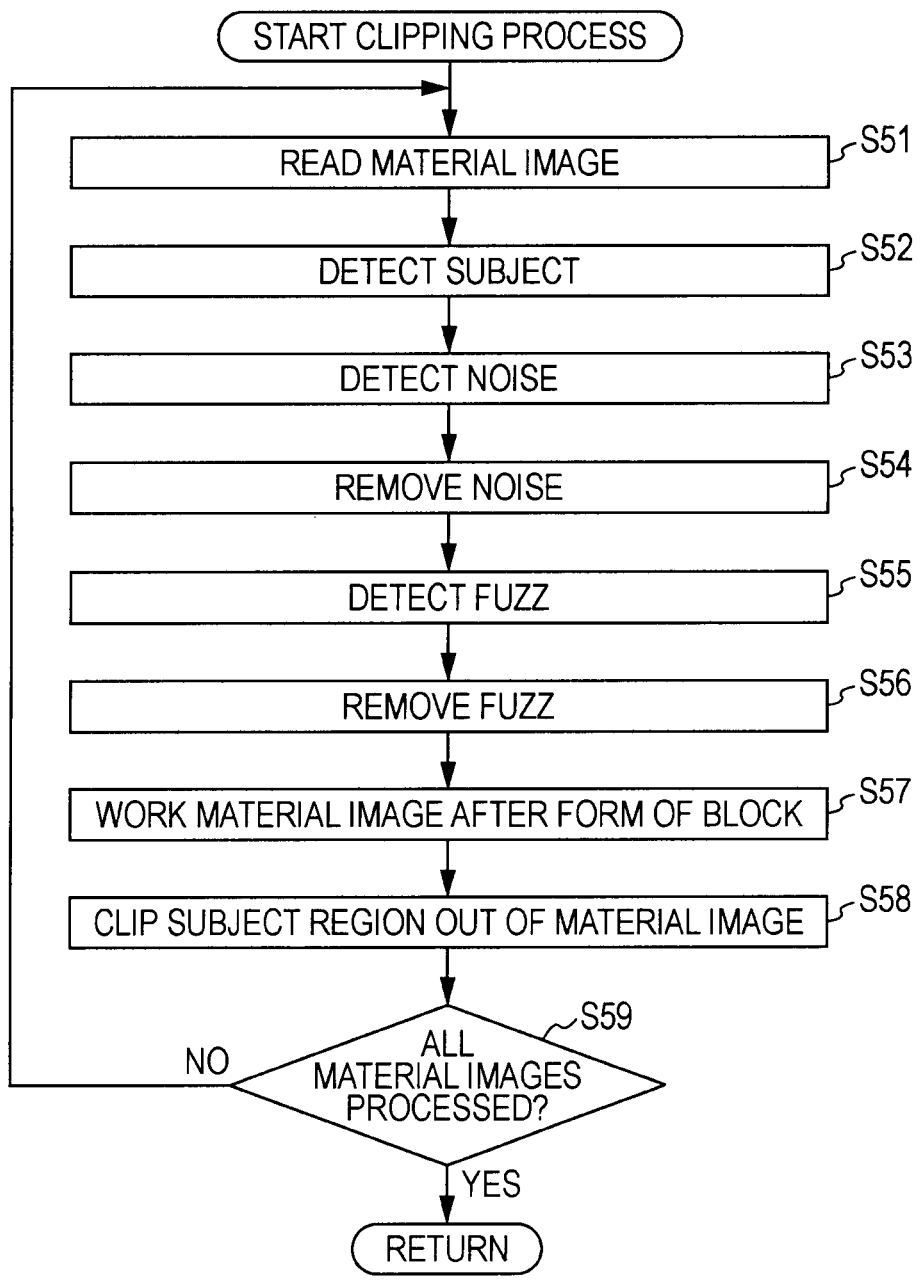
FIG. 7 is a flowchart illustrating one example of a clipping process.

Incidentally, the processes at step S65 to step S170 are the same as those at step S53 to step S58 in the example of the flowchart illustrated in FIG. 7 and hence description thereof will be omitted.

On the other hand, in the case that it is judged to have no relation at step S164, the material image is not used for generation of the clipped image, and hence the processes at step S165 to step S170 are not executed and the process proceeds to step S171. That is, the material image which has been processed so far is excluded from the objects to be used for generation of the clipped image.

In the case that the clipped image is generated at step S170 or it is judged to have no relation at step S164, the clipping unit 141 judges whether all the material images recorded in the image database recording unit 22 have been processed at step S171.

In the case that it is judged that all the material images are not yet processed at step S171, the process returns to step S161 and the above processes are executed again.

Figure 12:
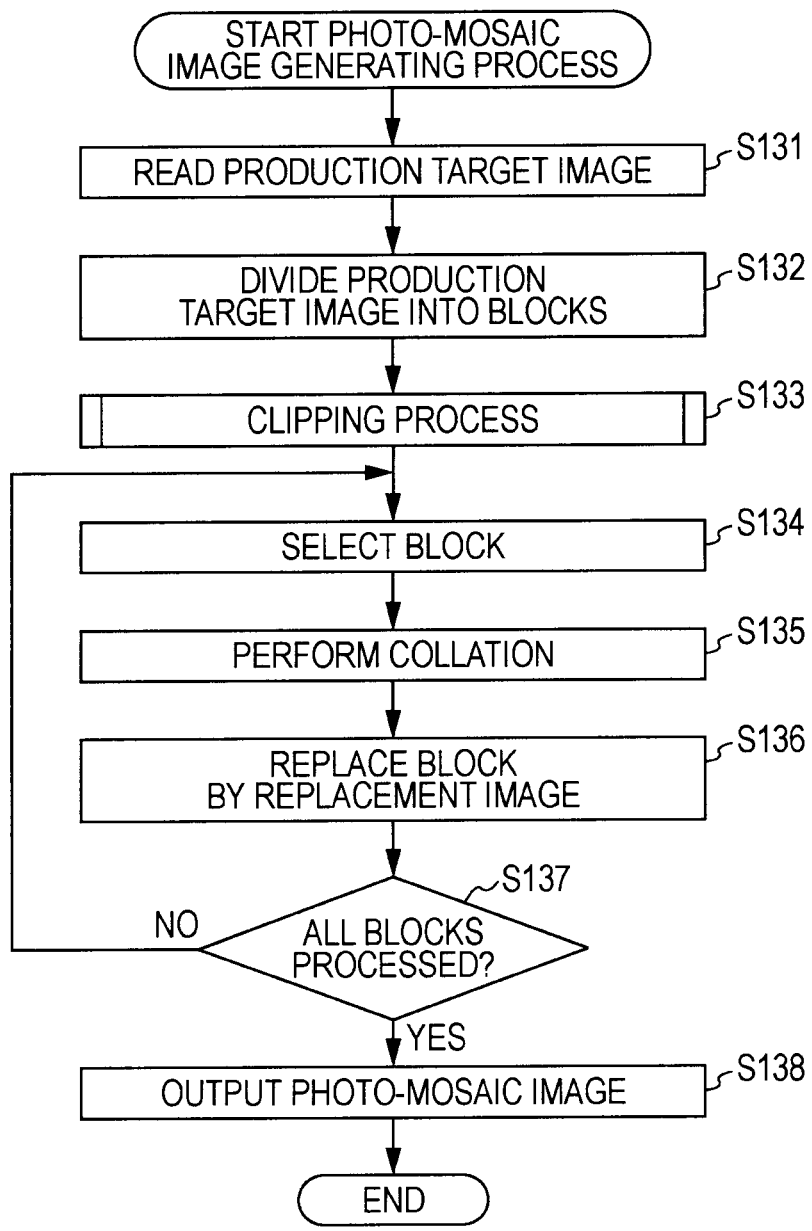
FIG. 12 is a flowchart illustrating another example of a photo-mosaic image generating process.

On the other hand, in the case that it is judged that all the material images have been processed at step S171, execution of the clipping process is terminated and the process proceeds to step S134 illustrated in the example of the flowchart in FIG. 12.

Returning to the explanation of the example of the flowchart illustrated in FIG. 12, after the clipping process has been executed at step S133, the processes at strep S134 to step S138 are executed to terminate execution of the photo-mosaic image generating process.

Figure 9:
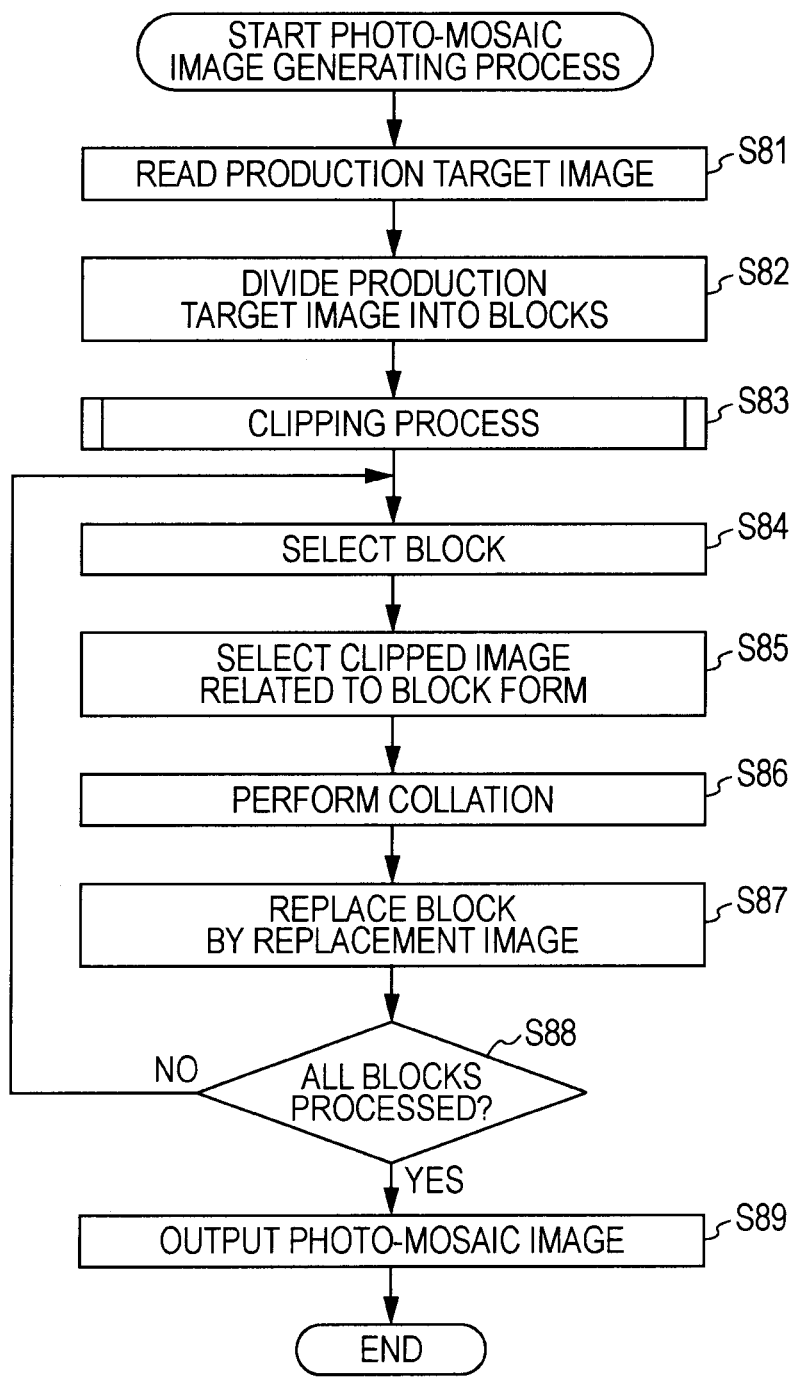
FIG. 9 is a flowchart illustrating one example of a photo-mosaic generating process.

Incidentally, the processes at step S134 to step S138 are the same as those at step S84 and step S86 to step S89 in the example of the flowchart illustrated in FIG. 9 and hence description thereof will be omitted. However, at step S135, in the clipped images recorded in the clipped image memory 30, each of the clipped images having the same form and size as the block to be processed is collated with the block and one clipped image to be used as the replacement image is selected from among the clipped images subjected to collation.

The image processing device 11 generates the clipped image using only the material image which is related to the form of each of blocks into which the production target image is divided in the material images which have been read out of the image database recording unit 22 in the above mentioned manner. As a result, it may be allowed to express a message with respect to a desired theme not only by using the subject included in the clipped image or the form itself of the clipped image but also by combining the subject with the form of the clipped image. Thus, the artistic property of the photo-mosaic image may be further improved.

Although the example in which the tag information indicating the subject is added in advance to the material image has been described, the subject may be extracted from the material image. In the above mentioned case, the tag information is not added to the material image. In the case that a result of extraction (identification) of the subject which has been executed by object recognition using the subject detecting unit 61 shows the subject which is indicated by the related information on the form of the block concerned, the selecting unit 171 supplies the material image to the noise detecting unit 62 as a material image to be used for generation of the clipped image.

In the examples illustrated in FIGS. 8 and 10, the image processing device 11 is configured such that the block on production the target image and the clipped image are not subjected to classification. However, even in the examples illustrated in FIGS. 8 and 10, the image processing device 11 may be configured such that the block and the clipped image are subjected to classification. In the latter case, since classification is performed for selection of the clipped image, in addition to selection of the clipped image using the tag information and by form recognition, it may be allowed to more accurately select the clipped images to be used as the candidates for the replacement image and to more rapidly obtain the suitable replacement image. In addition, in the case that pluralities of forms are prepared for the blocks and the clipped images, classification may be performed for each form.

It has been described that the region of the subject on the material image concerned is clipped as the clipped image by processing all the material images. However, for example, in the case that the block concerned is rectangular, the material image may be used as the clipped image as it is or a part of the material image may be clipped as the clipped image in accordance with the instruction from a user. In the above mentioned case, when the number of clipped images is insufficient for the blocks as a result of performance of classification, additional regions may be clipped out of the material image as clipped images so as to obtain clipped images belonging to the class concerned.

Incidentally, the image processing device 11 which has been described above may be configured, for example, using a computer or may be built into an imaging apparatus. In addition, the image processing device 11 may be mounted on various kinds of electronic equipment.

In addition, the material image and the production target image which have been described above are not limited to images (photographic images) taken using the imaging apparatus and may be any images such as images obtained by fetching paintings using a scanner and CG (Computer Graphics).

A series of processes as mentioned above may be executed both in hardware and software. In the case that the series of processes is to be executed in software, a program that configures the software concerned is installed into a computer which is incorporated into special-purpose hardware or a computer, for example, a general-purpose computer for executing various functions by installing therein various programs from a program recording medium.

FIG. 14 is a block diagram illustrating an example of a hardware configuration of a computer for executing a series of processes as mentioned above in accordance with a program.

In a computer, a CPU (Central Processing Unit) 201, a ROM (Read Only Memory) 202 and a RAM (Random Access Memory) 203 are connected with one another via a bus 204.

An input/output interface 205 is connected to the bus 204. An input unit 206 which includes a keyboard, mouse, and microphone, an output unit 207 which includes a display and loudspeaker, a recording unit 208 which includes a hard disk and nonvolatile memory, a communication unit 209 which includes a network interface, and a drive unit 210 which is configured to drive a removable medium 211 which includes a magnetic disk, an optical disk, a magnet-optical disk, and a semiconductor memory are connected to the input/output interface 205.

In the computer which is configured as mentioned above, the CPU 201 loads a program which is recorded, for example, in the recording unit 208 to the RAM 203 via the input/output interface 205 and the bus 204 and executes the loaded program, thereby performing a series of processes as mentioned above.

A program that the computer (the CPU 201) executes is provided by being recorded in the removable medium 211 which is a package medium which includes a magnetic disk (including a flexible disk), an optical disk (including a CD-ROM (Compact Disk-Read Only Memory) and DVD (Digital Versatile Disk)), a magnet-optical disk, and a semiconductor memory or by being transmitted via a line or radio transmission medium such as a local area network, Internet or digital satellite broadcasting.

Then, the program may be installed into the recording unit 208 via the input/output interface 205 by mounting the removable medium 211 in which the program is recorded on the drive 210. In addition, the program may be installed into the recording unit 208 by being received using the communication unit 209 via a lie or radio transmission medium. Further, the program may be installed in advance into the ROM 202 or the recording unit 208.

The program that the computer executes may be either a program in accordance with which processes are performed in time-series in order which is described in this specification or a program in accordance with which the processes are performed in parallel or at an appropriate timing at which, for example, a call has been made.

Incidentally, embodiments of the present invention are not limited to the above mentioned embodiments and the present invention may be modified in a variety of ways within a range not departing from the gist of the present invention.

The present application contains subject matter related to that disclosed in Japanese Priority Patent Application JP 2009-204425 filed in the Japan Patent Office on Sep. 4, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device that generates a photo-mosaic image, the image processing device comprising:
one or more processors operable to:
detect a subject in each of a plurality of material images and identify a type of the detected subject in each of the plurality of material images based on object recognition on the plurality of material images;
detect a shape of each block of a plurality of blocks obtained by dividing a production target image;
select one of the plurality of material images for each block of the plurality of blocks, each of the selected material images having the type of subject matching the shape of a corresponding block of the plurality of blocks;
perform a process on each of the selected material images to conform each of the selected material images to the shape and size of the corresponding block such that a region of the subject of each of the selected material images is within the corresponding block;

clip a subject-including region of each of the selected material images which has been subjected to the process and generate a plurality of clipped images in which the subject is included; and set one of the plurality of clipped images as a replacement image for the corresponding block of the production target image based on color-related characteristics of the corresponding block and replace the corresponding block by the replacement image to generate the photo-mosaic image.

2. The image processing device according to claim 1, wherein the process that each of the selected material images is subjected to comprises one or more of: a magnifying process, a reducing process, a deforming process and a rotating process.

3. The image processing device according to claim 1, wherein the one or more processors are operable to:

detect fuzz generated on each of the plurality of material images; and perform a filtering process to remove the fuzz on each of the plurality of material images.

4. The image processing device according to claim 1, wherein the one or more processors are operable to:

detect noise on each of the plurality of material images; and perform a filtering process to remove the noise on each of the plurality of material images.

5. The image processing device according to claim 1, wherein tag information about the subject in each of the plurality of material images is added in advance to each of the plurality of material images, wherein the one or more processors are operable to:

generate the plurality of clipped images to which the tag information is added;

select the plurality of clipped images, each including the subject which is related to the shape of the block, as candidates for the replacement image from among the plurality of clipped images on the basis of the tag information added to the plurality of clipped images; and select one clipped image of the plurality of clipped images to be used as the replacement image from the candidates to generate the photo-mosaic image.

6. The image processing device according to claim 5, wherein the one or more processors are operable to:

select one of the plurality of material images which includes the subject related to the shape of the corresponding block as an object to be used to generate each of the plurality of clipped images on the basis of the tag information, and perform the process on each of the selected material images.

7. An image processing method for use in an image processing device that generates a photo-mosaic image, the method comprising:

detecting a subject in each of a plurality of material images, the detecting comprising identifying a type of the detected subject in each of the plurality of the material images based on object recognition on the plurality of material images;

detecting a shape of each block of a plurality of blocks obtained by dividing a production target image;

selecting one of the plurality of material images for each block of the plurality of blocks, each of the selected material images having the type of subject matching the shape of a corresponding block of the plurality of blocks;

performing a process on each of the selected material images to conform each of the selected material images to the shape and size of the corresponding block such that a region of the subject of each of the selected material images is within the corresponding block;

clipping a subject-including region of each of the selected material images which has been subjected to the process and generating a plurality of clipped images in which the subject is included; and setting one of the plurality of clipped images as a replacement image for the corresponding block of the production target image based on color-related characteristics of the corresponding block and replacing the corresponding block by the replacement image to generate the photo-mosaic image.

8. A non-transitory computer readable medium encoded with a program for image processing of generating a photo-mosaic image, the program making a computer execute a process comprising:

detecting a subject in each of a plurality of material images, the detecting comprising identifying a type of the detected subject in each of the plurality of the material images based on object recognition on the plurality of material images;

detecting a shape of each block of a plurality of blocks obtained by dividing a production target image;

selecting one of the plurality of material images for each block of the plurality of blocks, each of the selected material images having the type of subject matching the shape of a corresponding block of the plurality of blocks;

performing a process on each of the selected material image to conform each of the selected material images to the shape and size of the corresponding block such that a region of the subject of each of the selected material images is within the corresponding block;

clipping the subject-including region of each of the selected material images which has been subjected to the process and generating a plurality of clipped images in which the subject is included; and setting one of the plurality of clipped images as a replacement image for the corresponding block of the production target image based on color-related characteristics of the corresponding block and replacing the corresponding block by the replacement image to generate the photo-mosaic image.

9. An image processing device that generates a photo-mosaic image, the image processing device comprising:

a subject detecting unit configured to detect a subject in each of a plurality of material images, the subject detecting unit identifying a type of the detected subject in each of the plurality of the material images based on object recognition on the plurality of material images;

shape detection unit configured to detect a shape of each block of a plurality of blocks obtained by dividing a production target image;

material image selecting unit configured to select one of the plurality of material images for each block of the plurality of blocks, each of the selected material images having the type of subject matching the shape of a corresponding block of the plurality of blocks;

a working unit configured to perform a process on each of the selected material images to conform each of the selected material images to the shape and size of the corresponding block such that a region of the subject of each of the selected material images is within the corresponding block;

an image generating unit configured to clip a subject-including region of each of the selected material images which has been subjected to the process and generate a plurality of clipped images in which the subject is included; and a replacing unit configured to set one of the plurality of clipped images a replacement image for the corresponding block of the production target image based on color-related characteristics of the corresponding block and replace the corresponding block by the replacement image to generate the photo-mosaic image.

10. The image processing device according to claim 1, wherein the photo-mosaic image is generated by dividing the production target image into the plurality of blocks of arbitrary forms and replacing each of the plurality of blocks by one or more replacement images.

* * * * *